US011086484B1

(12) United States Patent
Sinha et al.

(10) Patent No.: US 11,086,484 B1
(45) Date of Patent: *Aug. 10, 2021

(54) TECHNIQUES FOR CONTEXT SENSITIVE ILLUSTRATED GRAPHICAL USER INTERFACE ELEMENTS

(71) Applicant: Facebook, Inc., Menlo Park, CA (US)

(72) Inventors: Garima Sinha, Seattle (CA); Xiao Ou Wang, San Francisco, CA (US); Kent Fu Ho Tam, Beverly Hills, CA (US)

(73) Assignee: FACEBOOK, INC., Menlo Park, CA (US)

( * ) Notice: Subject to any disclaimer, the term of this patent is extended or adjusted under 35 U.S.C. 154(b) by 118 days.

This patent is subject to a terminal disclaimer.

(21) Appl. No.: 16/423,863

(22) Filed: May 28, 2019

Related U.S. Application Data

(63) Continuation of application No. 14/677,154, filed on Apr. 2, 2015, now Pat. No. 10,353,542.

(51) Int. Cl.
| *G06F 16/95* | (2019.01) |
| *G06F 3/0482* | (2013.01) |
| *G06F 16/9535* | (2019.01) |
| *H04M 1/72454* | (2021.01) |

(52) U.S. Cl.
CPC ........ *G06F 3/0482* (2013.01); *G06F 16/9535* (2019.01); *H04M 1/72454* (2021.01)

(58) Field of Classification Search
CPC .. G06Q 50/01; G06Q 30/0251; G06F 3/0484; H04L 51/32; H04L 65/403
USPC ......................................................... 707/766
See application file for complete search history.

(56) References Cited

U.S. PATENT DOCUMENTS

| 8,527,533 | B2* | 9/2013 | Davis | G06Q 30/0633 |
| | | | | 707/765 |
| 10,210,547 | B1* | 2/2019 | Wai | G06Q 30/0246 |
| 10,832,290 | B1* | 11/2020 | Chennavasin | G06Q 30/0267 |
| 2004/0110557 | A1* | 6/2004 | Rowe | G06Q 30/0209 |
| | | | | 463/25 |
| 2007/0226082 | A1* | 9/2007 | Leal | G06Q 30/0643 |
| | | | | 705/14.71 |
| 2008/0319841 | A1* | 12/2008 | Oliver | G06Q 30/0248 |
| | | | | 705/14.47 |

(Continued)

*Primary Examiner* — Hanh B Thai
(74) *Attorney, Agent, or Firm* — Kacvinsky Daisak Bluni PLLC

(57) ABSTRACT

Techniques for context sensitive illustrated graphical user interface elements, comprising a social networking application. The social networking application may include, among other components, a social networking graphical elements management component to provide a list of recommended graphical element identifier information, in response to a request for the list of recommended graphical element identifier information, a context determination component to determine user context information representative of the at least one user context based at least partially on user communications intent information, user profile information, device location information, calendar event information, and/or external event information, and a graphical elements recommendation component to generate the list of recommended graphical element identifier information based at least partially on the user profile information, graphical elements promotion information, and/or the user context information.

23 Claims, 10 Drawing Sheets

(56) References Cited

U.S. PATENT DOCUMENTS

| | | | | |
|---|---|---|---|---|
| 2009/0187437 A1* | 7/2009 | Spradling | ............... | G06Q 40/06 |
| | | | | 705/35 |
| 2010/0100433 A1* | 4/2010 | Penfield | ................. | G06Q 30/02 |
| | | | | 705/14.16 |
| 2010/0223119 A1* | 9/2010 | Klish | ..................... | G06Q 10/00 |
| | | | | 705/14.26 |
| 2011/0179114 A1* | 7/2011 | Dilip | .................... | G06F 16/9535 |
| | | | | 709/204 |
| 2012/0158765 A1* | 6/2012 | Kumar | ................. | G06F 16/3325 |
| | | | | 707/766 |
| 2012/0185782 A1* | 7/2012 | Storage | ................. | G09B 29/006 |
| | | | | 715/757 |
| 2013/0254289 A1* | 9/2013 | Cutri | ........................ | H04L 51/32 |
| | | | | 709/204 |
| 2014/0067535 A1* | 3/2014 | Rezaei | ................ | G06Q 30/0271 |
| | | | | 705/14.54 |
| 2014/0136323 A1* | 5/2014 | Zhang | .................... | G06Q 10/10 |
| | | | | 705/14.53 |
| 2014/0368601 A1* | 12/2014 | deCharms | ................ | H04L 67/26 |
| | | | | 348/14.02 |
| 2015/0058118 A1* | 2/2015 | Clurman | ............. | G06Q 30/0251 |
| | | | | 705/14.49 |
| 2015/0100537 A1* | 4/2015 | Grieves | ................. | G06F 3/0237 |
| | | | | 706/52 |
| 2015/0168150 A1* | 6/2015 | Kahn | ..................... | G01C 21/00 |
| | | | | 701/408 |
| 2015/0227972 A1* | 8/2015 | Tang | .................. | G06Q 30/0255 |
| | | | | 705/14.53 |
| 2015/0324933 A1* | 11/2015 | Allen | ..................... | G06Q 50/01 |
| | | | | 705/26.4 |
| 2016/0335603 A1* | 11/2016 | Davar | ..................... | G06F 16/28 |

* cited by examiner

TECHNIQUES FOR CONTEXT SENSITIVE ILLUSTRATED GRAPHICAL USER INTERFACE ELEMENTS

RELATED APPLICATIONS

This application is a continuation of, claims the benefit of and priority to previously filed U.S. patent application Ser. No. 14/677,154 filed Apr. 2, 2015, titled "TECHNIQUES FOR CONTEXT SENSITIVE ILLUSTRATED GRAPHICAL USER INTERFACE ELEMENTS", which is hereby incorporated by reference in its entirety.

BACKGROUND

A social networking system, such as a social networking website, enables one or more users to interact with each other in the social networking system by providing social networking services to the one or more users. With the recent increase in mobile devices, numerous users have also begun using their mobile devices to interact with the one or more users in the social networking system such, as, for example, social network messaging services. However, this increase in use of mobile devices to access social networking services has also placed an increased demand for improvements in social network messaging services, especially with respect to the use of illustrated graphical user interface elements.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for context sensitive illustrated graphical user interface elements. Some embodiments are particularly directed techniques for management of context sensitive illustrated graphical user interface (UI) elements. In one embodiment, for example, an apparatus may include a processor circuit, memory operatively coupled to the processor circuit, the memory to store a social networking application comprising a social networking graphical elements component for execution by the processor circuit. The social networking graphical elements component may comprise a social networking graphical elements management component to provide a list of recommended graphical element identifier information, in response to a request for the list of recommended graphical element identifier information, a context determination component to determine user context information representative of the at least one user context based at least partially on user communications intent information, user profile information, device location information, calendar event information, and/or external event information, and a graphical elements recommendation component to generate the list of recommended graphical element identifier information based at least partially on the user profile information, graphical elements promotion information, and/or the user context information. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1A:
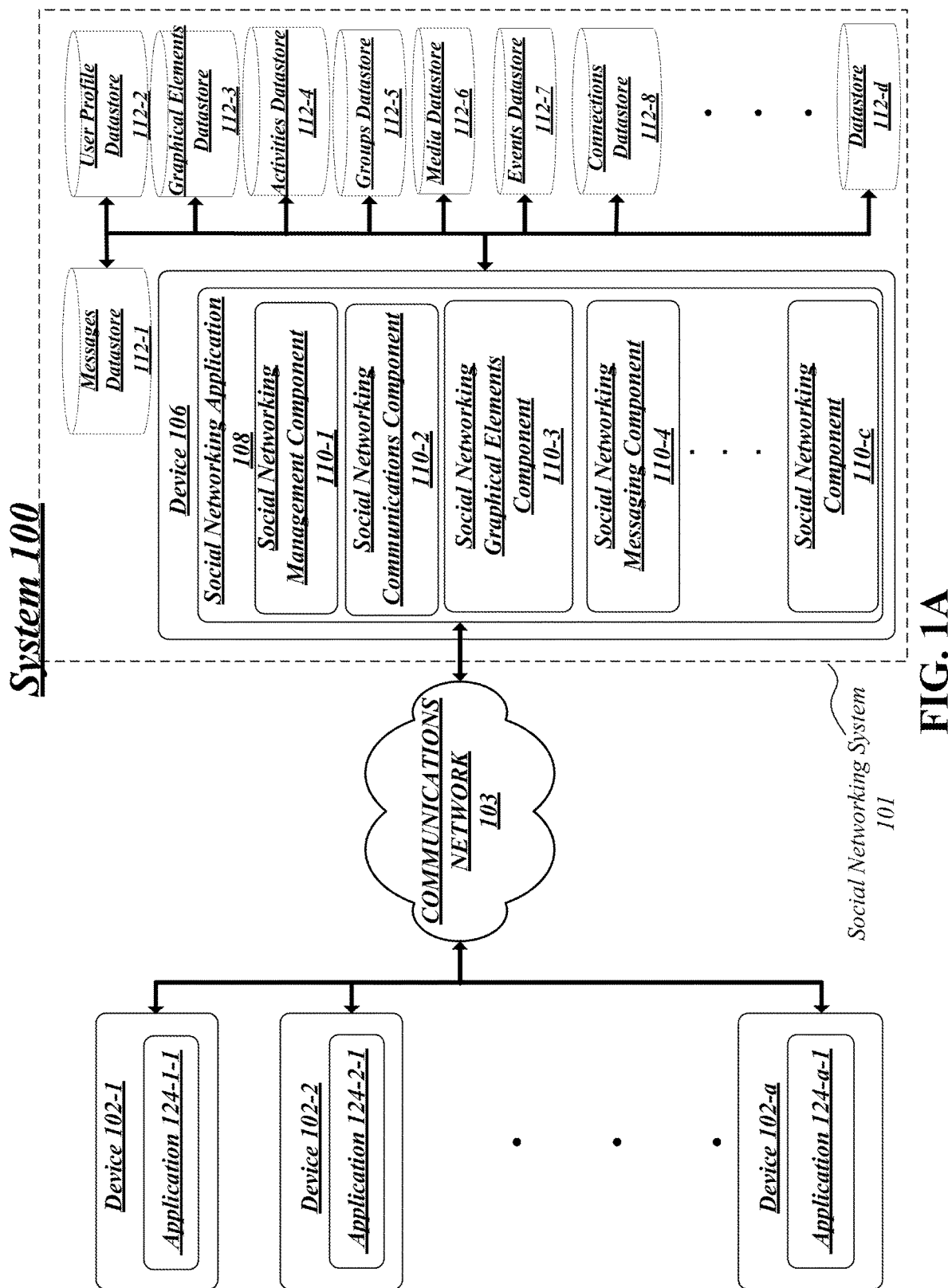
FIG. 1A illustrates an exemplary embodiment of a context sensitive illustrated graphical user interface elements system.

Various embodiments are generally directed to context sensitive illustrated graphical user interface elements. Typically, a mobile application may enable users to send and receive one or more social messages back and forth via a social networking system. To provide users with a more entertaining experience in their conversations and convey non-textual information, the context sensitive illustrated graphical user interface elements system may monitor the conversation and enable users to send and receive one or more illustrated graphical user interface elements, such as, for example, as "stickers."

To ensure that the illustrated graphical UI elements are relevant to a user's context including a user's intent within a social message, context sensitive illustrated graphical user interface elements system may analyze one or more social messages, including, received, transmitted, or a portion of a social message to be transmitted, and highlight, underline, or emphasize one or more terms, phrases, and/or symbols that correspond to a user's intent. The user may then select the emphasized terms, phrases, and/or symbols to request a list of recommended graphical element identifier information representative of one or more recommended graphical UI elements. The user's intent, in combination with other information (e.g., user's interests, user's location, user's calendar events, holiday events, etc.) associated with the user, which may be representative of a user's context, may then be analyzed to generate the list of recommended graphical element identifier information representative of the one or more recommended graphical UI elements for the user based at least partially on the user's intent.

To provide users with ease of selecting one or more illustrated graphical UI elements, the context sensitive illustrated graphical user interface elements system may render and visually present a grid of illustrated graphical UI elements for transmission or otherwise sharing with one or more recipient users in the social networking system. Additionally, the context sensitive illustrated graphical user interface elements system may rank the recommended illustrated graphical UI elements for visual presentation to the user on a device based at least partially on illustrated graphical UI elements that are currently being promoted, illustrated graphical UI elements user already owns, and illustrated graphical UI elements the user does not already own. Furthermore, one or more groups of predetermined size may be reserved for illustrated graphical UI elements that are currently being promoted, illustrated graphical UI elements user already owns, and illustrated graphical UI elements the user does not already own to ensure that users are visually presented with illustrated graphical UI elements.

To provide various entities with advertising opportunities, the context sensitive illustrated graphical user interface elements system may further bias the selection process of one or more illustrated graphical UI elements for visual presentation to a user on a device based at least partially on graphical elements promotion information which may representative of one or more entities that have provided financial interests to the operators and/or owners of the context sensitive illustrated graphical user interface elements system.

To provide incentives for users to share one or more illustrated graphical UI elements and consequently, increase brand recognition and/or advertisement opportunities, the context sensitive illustrated graphical user interface elements system may further provide promotions and/or discounts for users who share one or more illustrated graphical UI elements and/or the recipient users who received the one or more illustrated graphical UI elements. As a result of these improvements discussed above and elsewhere, the users' experiences in sharing images and/or videos on one or more devices may be greatly improved.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the needed purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the needed method steps. The needed structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1A illustrates an exemplary embodiment of a context sensitive illustrated graphical user interface elements system 100. In various embodiments, the context sensitive illustrated graphical user interface elements system 100 may comprise a social networking system 101 (e.g., Facebook, Google+, LinkedIn, etc.) and one or more devices 102-*a* (e.g., server devices, mobile devices, computing devices, networking devices, etc.) for providing social networking services to enable various users (e.g., persons, businesses, hardware/software components, computing devices, etc.) to communicate and interact between and among each other. To provide the social networking services to various users, the one or more devices 102-*a* associated with various users may be operatively coupled to the social networking system 101 via communications network 103 (e.g., internet, intranet, cellular network, etc.) utilizing various communications mediums (e.g., wired, wireless, fiber optic, etc.) and/or communications standards (e.g., Ethernet IEEE 802.3, Wireless IEEE 802.11, WiMAX IEEE 802.16, Global Systems for Mobile Communications (GSM), Enhanced Data Rates for GSM Evolution (EDGE), Long Term Evolution (LTE), etc.).

It is worthy to note that "a" and "b" and "c" and similar designators as used herein are intended to be variables representing any positive integer. Thus, for example, if an implementation sets a value for a=2, then a complete set of devices 102-*a* may include devices 102-1 and 102-2. Similarly, if an implementation sets value for a=2, then a complete set of applications 124-*a*-1 may include applications 124-1-1 and 124-2-1. Furthermore, if an implementation sets value for b=6, then a complete set of applications 124-1-*b* may include applications 124-1-1, 124-1-2, 124-1-3, 124-1-4, 124-1-5, and 124-1-6. The embodiments are not limited in this context.

To utilize the social networking services provided by the social networking system 101, each device of the one or more devices 102-*a* may be configured to execute at least application 124-*a*-1. The application 124-*a*-1 may be configured to communicate with the social networking system 101 via communications network 103 to provide the social networking services, such as, for example, social messaging services to the users. To maintain a persistent presence and ensure secure access to the social networking system 101, each user of application 124-*a*-1 may be associated with a user account in the social networking system 101. Each user account may be represented by user account information. The user account information for each user may include, but is not limited to, user account identifier (e.g., phone number, e-mail address, etc.), user account authentication token (e.g., user account password, physical and/or virtual security tokens, etc.), and/or any other information relevant to the authentication and authorization of each user.

To ensure authorized access of each user, the social networking system 101 may be further configured to authenticate each user based on at least a portion of the user account information (e.g., user account identifier, user account authentication token, etc.) provide by each user and received from one or more devices 102-*a*. Once a user having the associated user account has been successfully authenticated, the social networking system 101 may provide the application (e.g., application 124-1-1 and/or application 124-1-2) with one or more time limited access tokens having a set of access permissions associated with the user account of the user to retrieve, store, modify, update, and/or otherwise access information within a specific time period in the social networking system 101 utilizing the application.

Each user account may be further associated with a user profile representative of a user's presence within the social networking system 101. Each user profile associated with each user may be represented by user profile information, which may include, but is not limited to, user identifier information (e.g., a unique identifier that identifies the user and the user profile information), user biographic and/or demographic information, (e.g., user name information which may include, but is not limited to, a first, middle, and/or last name of the user, an entity name associated with the user, contact information of the user, birth date of the user, age of the user, sex of the user, etc.), user profile media information (e.g., profile image(s) of the user, a focused user profile image of the user, etc.), user location information (e.g., the hometown location of the user, the current location of the user, the work location(s) of the user, etc.), user time zone information (e.g., time zone of the user, etc.), user social connections information (e.g., a list of friends, family members, coworkers, teammates, classmates, business associates, of the user), user groups membership information, user interest information (e.g., the interests listed by the user, movies listed by the user, music listed by the user, books listed by the user, approvals or "likes" of the user, or any other information that may identify the user's interest), user employment history information (e.g., list of current and/or past employers of the user), user social messages information (e.g., one or more social networking messages where the user is a recipient), user event information (e.g., one or more social events associated with the user, etc.), user profile discussion information (e.g., one or more profile activities, such as, profile posts in the user profile), user search information (e.g., one or more search queries inputted by the user), user illustrated graphical elements ownership information (e.g., references to one or more illustrated graphical UI elements stored in the graphical elements datastore 112-3 possessed or otherwise owned by the user), user illustrated graphical elements usage information (e.g., references to one or more illustrated graphical UI elements that are purchased by and/or otherwise owned by the user and the associated usage frequency for each illustrated graphical UI element, etc.) or any other preference/personal information associated with the user.

Figure 1B:
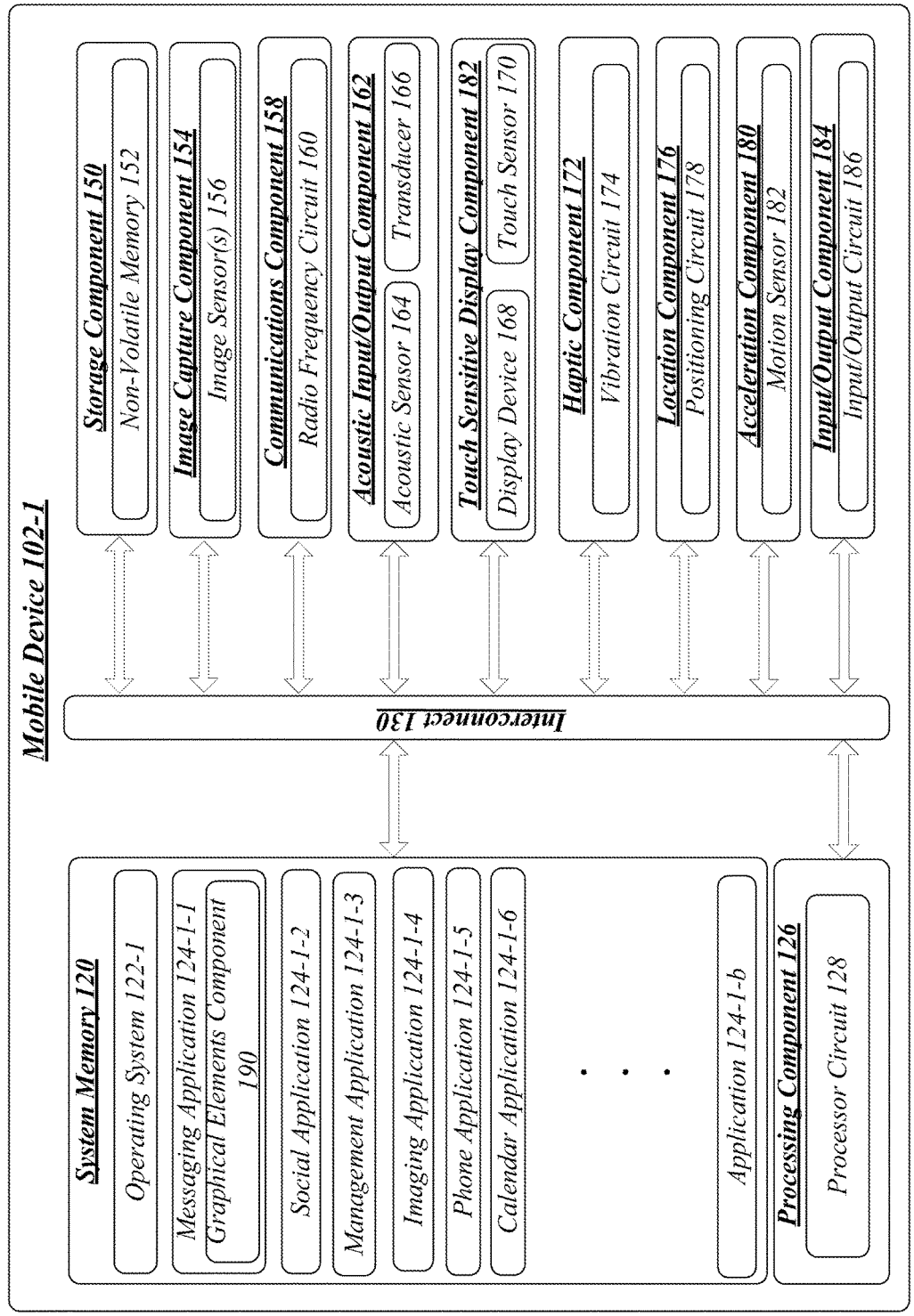
FIG. 1B illustrates an exemplary embodiment of a device, which may be a mobile device, comprising one or more applications.

In some embodiments, the social networking system 101 may enable one or more applications (e.g., social application 124-1-1 further discussed with respect to FIG. 1B, etc.) of device 102-*a* to retrieve at least a portion of the user profile information associated with the user and display at least a portion of the user profile information on one or more display screens operatively coupled to the devices 102-*a*. To facilitate user interaction between and among users in the social networking system 101, the social networking system 101 may also enable users to search user profile of other users based at least partially on a received search query and at least a portion of the user profile information associated with other users, retrieve at least a portion of the user profile information of the other users, and form one or more social connections with other users by enabling users via the one or more applications of devices 102-*a* to identify other users as the user's friend, family member (e.g., spouse, cousin, mother, father, grandmother, grandfather, brother, sisters, daughter, son, etc.), coworker, teammate, classmate, business associate, or any other social relationship.

It may be appreciated that the social connections formed between a pair of users may be unidirectional, when only one user in the pair of users identifies and acknowledges the type and existence of social relationship. Alternatively, the social connections formed between the pair of users may be bidirectional when both users in the pair of users identify the same type of social relationship and the existence of social relationship. As such, the social networking system 101 further receive, provide, and/or update user social connections information which may include, but is not limited to, a list of social connection information representative of the social connections of the user (e.g., the user identifier information or other resource or social networking object the user is connected to) and the social connection type information representative of a social connection type (e.g., friend, family member, coworker, teammate, classmate, business associate, and/or any other social relationship) associated with each social connection. Based on the user social connections information of a plurality users, the social networking system 101 may be further configured to determine social proximity information which may include, but is not limited to, the degree of separation between one or more pairs of users.

In some embodiments, the social networking system 101 may further enable users to create, publish, or post one or more profile activities (e.g., posts, polls, Universal Resource Identifier/Universal Resource Locator (URI/URL) references, etc.), or any other information on the user's own user profile represented by the user profile information. Additionally, in some embodiments, the social networking system 101 may further enable some users to create, publish, post one or more profile activities on user profiles of other users based at least partially on the user social connection information of the other users. The social networking system 101 may also enable users to send and/or receive private social messages to one or more users by communicating the user social messages information comprising one or more private social messages to and from one or more users.

To provide collaboration and between and among a specific set of users, including between and among users that may not have a social connection with other users in the specific set of users, the social networking system 101 may further enable the association and/or management of one or more groups. In some embodiments, each group may be represented by social group information, which may include, but is not limited to, group identifier information (e.g., a unique identifier that identifies a particular group in the social networking system 101), group privacy information (e.g., group privacy type for the particular group which may include, but is not limited to, secret group type, open group type, or closed group type), group cover image information, group description information (e.g., a description associated with the particular group), group name information (e.g., the group name of the particular group), group owner information (e.g., the owner of the particular group), group location information (e.g., the location of the particular group), group membership information (e.g., a list of group members in the particular group), group membership count information (e.g., a total number of group members in the particular group), or any other information associated with one or more groups.

In some embodiments, the social networking system 101 may enable users to create one or more groups in the social networking system 101 utilizing the one or more applications (e.g., social application 124-1-2 of FIG. 1B, etc.). Moreover, the social networking system 101 may enable users to create one or more groups by receiving at least a portion of the social group information (e.g., group privacy information, group cover image information, group description information, group name information, group owner information, group membership information), and creating a group based at least partially on the received social group information.

In some embodiments, the social networking system 101, may provide users with the latest updates regarding the activities of their social connections, groups, messages, or any other aspects of users' online presence. To provide the latest updates, the social networking system 101 may generate and/or provide users with one or more notifications regarding the activities of their friends, family members, coworkers, teammates, classmates, business associates (i.e., user notifications), one or more notifications regarding the activities within one or more groups where the users may be group members (i.e., user group notifications), and/or one or more notifications regarding the activities within one or more forums where the users may be forum members (i.e., user forum notifications).

To provide users with these and other social networking services, the social networking system 101 may comprise server device 106 which may include, among other applications, social networking application 108. The social networking system 101 may further comprise one or more datastores 112-*d* operatively coupled to the server device 106. The one or more datastores 112-*d* may be configured to store one or more resources or social networking objects representative of the information received and provided by the social networking system 101. Moreover, the social networking objects of the social networking system 101 may include, but is not limited to, user social messages information for one or more users which may be stored in the messages datastore 112-1, one or more user profiles which may be stored in the user profiles datastore 112-2, one or more illustrated graphical UI elements which may be stored in the graphical elements datastore 112-3, one or more activities (e.g., posts, polls, threads, etc.) which may be stored in the activities datastore 112-4, one or more groups which may be stored in the groups datastore 112-5, media information (e.g., images, videos, files, etc.) which may be stored in media datastore 112-6, one or more events which may be stored in events datastore 112-7 (e.g., social events organized between and among one or more users, etc.), or any other social networking object that may be received, stored, provided, or otherwise tracked and/or accessed by the social networking system 101 to provide the users with these and other social networking services.

The one or more datastores 112-*d* may further store object connections between two or more objects or resources in the object connections datastore 112-8. Moreover, the object connections may be representative of the relationship or links between the two or more objects. The one or more social networking objects in conjunction with one or more objects connections may form a social graph comprising two or more nodes interconnected via one or more edges, where each node may be representative of a social networking object and each edge may be representative of the object connections between two or more social networking objects in the social networking system 101. To enable the application 124-*a*-1 to retrieve, modify, update or otherwise access the various information managed by the social networking system 101 and represented as the social graph, the social networking application 108 may further provide a graph application program interface (API) utilizing various protocols (e.g., HTTP, HTTPs, etc.).

In some embodiments, the social networking application 108 may include one or more social networking components 110-*c*. At least some of the one or more social networking components 110-*c* may be arranged to implement at least a portion of the graph API. The one or more social networking components 110-*c* may include, but is not limited to, a social networking management component 110-1, a social networking communications component 110-2, social networking graphical elements component 110-3, and/or social networking messaging component 110-4.

The social networking management component 110-1 may be generally arranged to enable association and management of one or more groups by one or more users, enable association and management of one or more user profiles and/or user accounts by one or more users, enable communications between and among one or more users via of one or more messages, search for information in the social networking system 101 in response to one or more search queries received from one or more users via applications 124-*a*-1, and provide search results to one or more users via the one or more applications 124-*a*-1.

The social networking graphical elements component 110-3 may be generally arranged to manage the illustrated graphical elements information stored in the graphical elements 112-3, determine user context information (e.g., user context information 224, etc.) for one or more users based at least partially on at least a portion of user profile information (e.g., user social messages information, user interest information, user groups membership information, user biographic information, user demographic information, etc.), user intent information, location information, calendar event information and/or external event information (e.g., weather information, sports information, etc.). Additionally, the social networking graphical elements component 110-3 may also be generally arranged to suggest or recommend one or more illustrated graphical UI elements stored in graphical elements datastore 112-3 based at least partially on user context information 224, user profile information 224, graphical element promotion information 219. The suggestions or recommendations may be provided in a list of illustrated graphical element information 230.

The social networking messaging component 110-4 may be generally arranged to provide messaging services to one or more users of the social networking system 101. Moreover, the social networking messaging component 110-4 may be arranged to receive one or more social messages from users utilizing one or more applications 124-*a*-1 of one or more devices 102-*a*. The social networking messaging component 110-4 may be arranged to transmit one or more received social messages to the respective users via one or more applications 124-*a*-1 and/or 124-*a*-2 of one or more devices 102-*a*. Additionally, the social networking messaging component 110-4 may also be arranged to store the received and/or transmitted messages between and among users in a messages datastore 112-1. It may be appreciated that the one or more social messages may include, but is not limited, to multi-media social messages which may include, but is not limited to, images, video, and/or illustrated graphical UI elements further discussed below and/or elsewhere.

The social networking communications component 110-2 may be generally arranged to provide communications for the one or more social networking components 110-*c* and communicate (e.g., transmit and/or receive information, etc.) with the one or more applications 124-*a*-1 and via communications network 103.

FIG. 1B illustrates an exemplary embodiment of a device 102-1, and in some embodiments, the device 102-1 may be a mobile device 102-1 (e.g., a mobile phone or any other a portable computing and/or communications device), comprising one or more applications 124-1-*b*, in the mobile predictive power management system 100. The mobile device 102-1 may be generally arranged to provide mobile computing and/or mobile communications and may include, but is not limited to, system memory 120, processing component 126, storage component 150, image capture component 154, communications component 158, acoustic input/output component 162, touch sensitive display component 182, haptic component 172, location component 172, acceleration component 180 and input/output component 184, where each of the components and system memory 120 may be operatively connected via interconnect 130.

In some embodiments, the processor component 126 may be generally arranged to execute instruction information including one or more instructions. In some embodiments, the processor component 126 may be a mobile processor component or system-on-chip (SoC) processor component which may comprise, among other elements, processor circuit 128. The processor circuit 128 may include, but is not limited to, a central processor unit (CPU) comprising a first set of electronic circuits arranged to execute one or more instructions and/or a graphics processing unit (GPU) comprising a second set of electronic circuits arranged to execute one or more graphics-oriented instructions. Exemplary processor components 126 may include, but is not limited to, Qualcomm® Snapdragon®, Nvidia® Tegra®, Intel® Atom®, Samsung® Exynos, Apple® A7®, Apple® A8®, or any other type of mobile processing component 126 arranged to execute the instruction information including the one or more instructions stored in system memory 120 and/or storage component 150.

In some embodiments, the storage component 150 may be generally arranged to store information in volatile and/or nonvolatile memory, which may include, but is not limited to, read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM) flash memory, polymer memory such as ferroelectric polymer memory, ovonic memory, phase change or ferroelectric memory, silicon-oxide-nitride-oxide-silicon (SONOS) memory, solid state memory devices (e.g., USB memory, solid state drives SSD, etc.), and/or any other type of storage media configured for storing information.

In some embodiments, the image capture component 154 may be generally arranged to capture one or more images or a sequence of one or more images (e.g., video, etc.) and provide image information and/or video information. The image capture component 154 may include, among other elements, image sensor(s) 156. Exemplary image sensors(s) 156 may include, but is not limited to, charged-coupled devices (CCD), active-pixel sensors (APS), or any other type of image sensors arranged for converting optical images into electronic signals that may be compressed, encoded, and/or stored as image information and/or video information. It may be appreciated that while not illustrated, in some embodiments, the image sensor(s) 156 may be positioned to enable a user to view the image information and/or video information visually presented on the display device 168 and captured by the image sensor(s) 156 substantially in real time, so that the user may easily capture, for example, a self-portrait utilizing the image sensor(s) 156. For example, the image sensor(s) 156 may be physically positioned or placed on the same plane as the display device 168 of the touch sensitive display component 182 and may be physically arranged to face a user using the mobile device 102-1. This may enable the image sensor(s) 156 to capture and convert at least optical images that are substantially perpendicular to the same plane as the display device 168. Additionally or alternatively, the mobile device 102-1 may further include, but is not limited to, additional image sensors positioned in other physical locations of the mobile device 102-1.

In some embodiments, the communications component 158 may be generally arranged to enable the mobile device 102-1 to communicate with the social networking system 101 via the communication network 103. The communications component 158 may include, among other elements, a radio frequency circuit 160 configured for encoding and/or decoding information and receiving and/or transmitting the encoded information as radio signals in frequencies consistent with the one or more wireless communications standards (e.g., Wireless IEEE 802.11, WiMAX IEEE 802.16, Global Systems for Mobile Communications (GSM), Enhanced Data Rates for GSM Evolution (EDGE), Long Term Evolution (LTE), etc.). Furthermore, the communications component 158 may also generate and/or provide communication connection type information which may be configured to indicate the current connection type. The communication connection type information may include, but is not limited to, cellular connection type to indicate the mobile device 102-1 is connected to communication network 103 using wireless cellular communications standards (e.g., GSM, LTE, etc.), Wifi connection type to indicate the mobile device 102-1 is connected to the communication network 103 using wireless IEEE 802.11 standards, disconnected connection type to indicate the mobile device 102-1 is disconnected from the communication network 103, and/or any other type of information that may indicate the type of connection the mobile device 102-1 is currently utilizing to connect to communication network 103.

In some embodiments, the acoustic input/output (I/O) component 162 may be generally arranged for converting sound, vibrations, or any other mechanical waves received into electronic signals representative of acoustic input information utilizing an acoustic sensor 164 (e.g., a microphone, etc.). Additionally, the acoustic I/O component 162 may be further arranged to convert electronic signals representative of acoustic output information utilizing an electroacoustic transducer 166 (e.g., a speaker, etc.) to output sound, vibrations, or any other mechanical waves.

In some embodiments, the touch sensitive display component 182 may be generally arranged to receive and present visual display information, and provide touch input information based on detected touch based or contact based input. Moreover, the touch sensitive display component 182 may include, among other elements, a display device 168 (e.g., liquid-crystal display, light-emitting diode display, organic light-emitting diode display, etc.) for presenting the visual display information and touch sensor 170 (e.g., resistive touch sensor, capacitive touch sensor, etc.) associated with the display device 168 to detect and/or receive touch or contact based input information via associated with the display device 168. Additionally, in some embodiments, the touch sensor 170 may be integrated with the surface of the display device 168, so that a user's touch or contact input may substantially correspond to the presented visual display information on the display device 168.

In some embodiments, the haptic component 172 may be generally arranged to provide tactile feedback through the housing, case, or enclosure of the mobile device 102-1. Moreover, the haptic component 172 may include, among other elements, a vibration circuit 174 (e.g., an oscillating motor, vibrating motor, etc.) arranged to convert haptic information to mechanical vibrations representative of tactile feedback.

In some embodiments, the location component 176 may be generally arranged to receive positioning signals representative of positioning information and provide location information (e.g., approximate physical location of the current mobile device 102-1) based at least partially on the received positioning information. Moreover, the location component 176 may include, among other elements, a positioning circuit 178 (e.g., a global positioning system (GPS) receiver, etc.) arranged to determine the physical location of the mobile device 102-1. In some embodiments, the location component 176 may be further arranged to communicate and/or interface with the communications component 158 and communicate with the communications network 103 in order to provide greater accuracy and/or faster location acquisition of the location information.

In some embodiments, the acceleration component 180 may be generally arranged to detect acceleration of the mobile device 102-1 in one or more axes. The acceleration component 180 may include, among other elements, motion sensor 182 (e.g., accelerometer, etc.) to convert physical motions applied the mobile device 102-1 into motion information.

In some embodiments, the input/output component 184 may be generally arranged to provide signal I/O and may include, among other elements, input/output circuit 186. Exemplary input/output components 184 may include, but is not limited to, microphone input component, headphone output component, universal serial bus (USB) component, or any other signal input/output component.

In some embodiments, the system memory 120 may be generally arranged to store information in volatile and/or nonvolatile high speed memory similar to those discussed with respect to storage component 150. In some embodiments, at least a portion of the stored information in the system memory 120 may comprise instruction information arranged for execution by the processing component 126. In those embodiments, the instruction information may be representative of at least one operating system 122-1, one or more applications 124-1-*b*, and/or any other programs and/or modules. In some embodiments, the one or more applications 124-1-*b* may include, but is not limited to, a management application 124-1-3 generally arranged to manage the execution of the one or more applications 124-1-*b* of the mobile device 102-1. The one or more applications 124-1-*b* may further include, but is not limited to, messaging application 124-1-1, social application 124-1-2, imaging application 124-1-4, phone application 124-1-5, calendar application 124-1-6, audio/video application 124-1-12, and/or any other application generally arranged for execution by the processing component 126.

In some embodiments, the operating system 122-1 may comprise a mobile operations system 122-1 (e.g., Apple®, iOS®, Google® Android®, HP® WebOS®, Microsoft® Windows Phone®, Microsoft® Windows®, etc.) general arranged to manage hardware resources (e.g., one or more components of the mobile device 102-1) and/or software resources (e.g., one or more applications 124-1-*b* of the mobile device 102-1). The operating system 122-1 may be further arranged to modify execution states associated with one or more applications 124-1-*b* based at least partially on information received from one or more components (e.g., touch sensitive display component 182, power source component (not shown), location component 176, communications component 158, etc.) and/or one or more applications (e.g., messaging application 124-1-1, social application 124-1-2, management application 124-1-3, imaging application 124-1-4, phone application 124-1-5, calendar application 124-1-6, etc.).

In some embodiments, the operating system 122-1 may be arranged to modify execution states by transitioning the one or more applications 124-1-*b* between and among the one or more execution states. The one or more execution states may include, but is not limited to, foreground state, non-execution state, suspended state, and/or background state. In some embodiments, applications 124-1-*b* may be initially in the non-execution state where the instruction information associated with applications 124-1-*b* in the non-execution state are not executed by the processor component 126 nor scheduled for execution by the processor component 126.

In some embodiments, the operating system 122-1 may transition an application (e.g., messaging application 124-1-1) may transition from the foreground state to the suspended state, in response to a request to launch a different application (e.g., transitioning the different application, such as, for example, social application 124-1-2 from non-execution state to the foreground state), switch to a different application (e.g., transitioning the different application, such as, for example, social application 124-1-2 from background state to the foreground state), or resume a different application (e.g., transitioning the different application, such as, for example, social application 124-1-2 from suspended state to the foreground state). In some embodiments, the operating system 122-1 may transition the application from the foreground state to the background state where a limited portion of the instruction information (e.g., instruction information associated with a background thread of the application, etc.) associated with the application is continued for further execution by the processor component 126 while the one or more UI views may not be visible or partially visible on the display device 168.

In some embodiments, the management application 124-1-3 may be visually presented as a home screen UI view (not shown) comprising a plurality of UI elements representative of applications 124-1-*b* and may be generally arranged to launch on startup of the mobile device 102-1 and operating system 122-1. Additionally, the management application 124-1-3 may be arranged to receive touch input information from the touch sensitive display component 182 in order to launch one or more applications 124-1-*b*. In some embodiments, the management application 124-1-3 may be arranged to request the operating system 122-1 to launch or initiate the execution of one or more applications 124-1-*b* of mobile device 102-1 based at least partially on the received input information (e.g., touch based input information received from touch sensor 170, etc.).

In some embodiments, the imaging application 124-1-4 may be generally arranged to receive, store, display and/or otherwise manage image information and/or video information via the image capture component 154. In some embodiments, the messaging application 124-1-1 may include, but is not limited to, an illustrated graphical elements component 190 and may be generally arranged to receive, transmit, display, and/or otherwise manage one or more messages including multimedia messages (e.g., pictures, videos, audio, etc.) utilizing one or more cellular and/or internet messaging services via one or more components of the mobile device 102-1. In some embodiments, the social application 124-1-2 may be generally arranged to provide social networking services between and among one or more users of one or more devices (e.g., Twitter®, Vine®, Facebook®, Reddit®, Digg®, Imgur®, etc.). In some embodiments, the imaging application 124-1-3 may be generally arranged to receive, store, display and/or otherwise manage image information and/or video information received via the image capture component 154 and/or communications component 158 and/or stored in memory 120/and/or storage component 150. In some embodiments, the phone application 124-1-5 may be generally arranged to receive, make, display, and/or otherwise manage one or more audio and/or video phone calls utilizing one or more cellular and/or internet phone services via one or more components of the mobile device 102-1. In some embodiments, the calendar application 124-1-6 may be generally arranged to store one or more appointments, meetings, and/or reminders, for a user of the mobile device 102-1. In some embodiments, the imaging application 124-1-4 may be generally arranged to record, playback, or output audio and/or video information received via communications component 158 and/or stored in memory 120 and/or storage component 150.

Figure 1C:
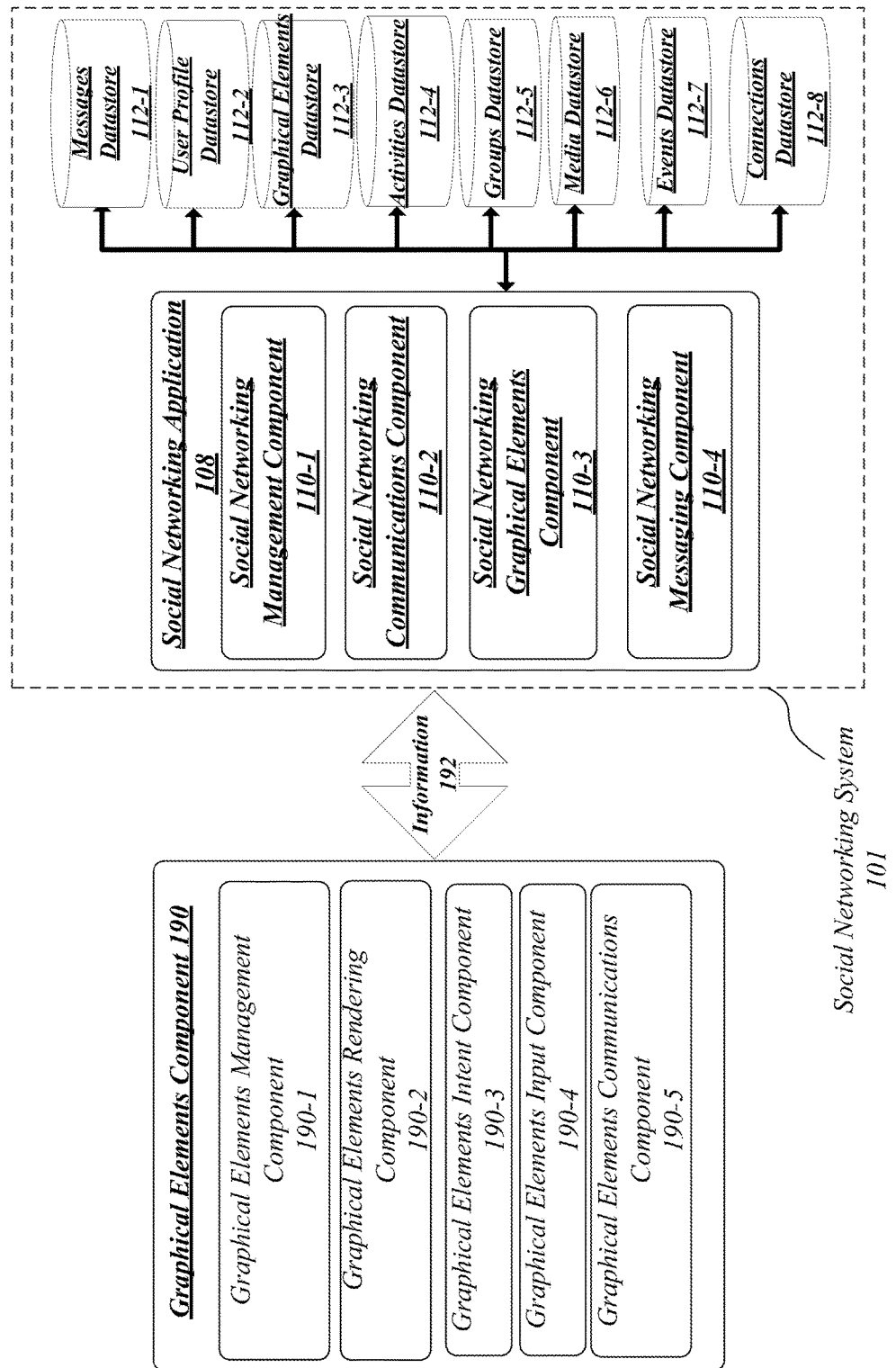
FIG. 1C illustrates an exemplary embodiment of the graphical element component which may be operatively coupled to a messaging application.

FIG. 1C illustrates an exemplary embodiment of the illustrated graphical elements component 190 for managing one or more illustrated graphical UI elements transmitted and/or received between and among one or more users in the social networking system 101 utilizing, for example, messaging application 124-1-1. It may be appreciated that, while not illustrated, the social application 124-1-2 and/or messaging application 124-1-1 may be generally arranged to authenticate a user having an associated user account in the social networking system 101 based on at least a portion of the user account information (e.g., user account identifier and user account authentication token) inputted by the user utilizing, for example, an on-screen virtual keyboard or any other input information.

Moreover, once the user having the associated user account has been authenticated, the social application 124-1-2 and/or messaging application 124-1-1 may be configured to receive one or more time limited access tokens from the social networking application 108, and store the one or more time limited access tokens in the storage component 150 and/or system memory 120 of the mobile device 102-1 for use by the one or more components of the social application 124-1-2 and/or messaging application 124-1-1 (e.g., graphical elements component 190) to utilize one or more services provided by the social networking system 101 as a user having the associated user account information and/or user profile information. The graphical elements component 190 may further include one or more components, which may include, but is not limited to, graphical elements management component 190-1, graphical elements rendering component 190-2, graphical elements intent component 190-3, graphical elements input component 190-4, graphical elements communications component 190-5.

The graphical elements communications component 190-5 may be generally arranged to receive, transmit, and/or otherwise facilitate communications of information 192 between the one or more components of the graphical elements component 190, and the social networking system 101 utilizing the received, stored, and/or cached one or more time limited access tokens, one or more APIs (e.g., graph API), one or more components of the messaging application 124-1-1, one or more components of the mobile device 102-1 (e.g., the communications component 158), and communications network 103.

The graphical elements rendering component 190-2 may be generally arranged to provide visual display information to the touch sensitive display component 182 and render at least a portion of one or more UI views comprising one or more UI elements for visual presentation on the display device 168. In some embodiments, the graphical elements rendering component 190-2 may be further arranged to provide visual display information to the touch sensitive display component 182 to render one or more animated transitions between the one or more views and/or render one or more animated UI elements for visual presentation on the display device 168.

The graphical elements intent component 190-3 may be generally arranged to periodically (e.g., every 5 minutes, every 10 minutes, every hour, every 12 hours, every day, etc.) receive communications intent clusters information (e.g., communications intent clusters information 225), analyze one or more received, transmitted, and/or inputted social messages based at least partially on received communications intent clusters information from the social networking graphical elements component 110-3, and/or configure the graphical elements rendering component 190-2 to render and visually present one or more selectable graphical element selection UI elements.

In some embodiments, the received the communications intent clusters information may include, but is not limited to, one or more communication intent clusters, each communication intent cluster may be representative of a user's intent or intent of a user for a social message, which may be represented by one or more terms, a short phrase, and/or symbols. To ensure that a wide variety of a user's intent expressed in one or more social messages are properly identified, each message intent cluster may be representative of a user intent (e.g., "hungry", "not hungry", "excited", "anxious", "happy", "sad", etc.) associated with one or more terms, short phrases (e.g., synonyms, idioms, etc.), and/or symbols (e.g., text based ideograms, emoji, ASCII based emoticons, etc.) that may be associated with a user's intent.

In one non-limiting example, a communication intent cluster may be representative of "hungry" indicating that a user may be hungry for food. The communication intent cluster representative of "hungry" may be associated with a cluster of terms, phrases, and/or symbols such as, for example, "hunger", "hungry", "starving", "starve" "starved", "famished", "famish", ":0" and/or any other terms and/or phrases that may indicate that the user is hungry. In another non-limiting example, a communication intent cluster may be representative "not hungry" indicating that the user is not hungry for food. The communication intent cluster may also be associated with a cluster of terms and/or phrases such as, for example, "full", "am full", "stuffed", "am stuffed", "are stuffed", "not hungry", and/or any other terms or phrases that may indicate that the user is not hungry.

In some embodiments, graphical elements intent component 190-3 may be configured to analyze received, transmitted, and/or inputted social messages by scanning and matching one or more terms, phrases, and/or sequence of symbols in one or more received, transmitted, and/or inputted social messages. In one non-limiting example, the graphical elements intent component 190-3 may search and match one or more received, transmitted, and/or inputted social messages for one or more terms, phrases, and/or sequence of symbols with one or more terms, phrases, and/or symbols associated with communication intent clusters represented by the received communications intent clusters information.

In some embodiments, the graphical elements intent component 190-3 may be configured to analyze, in near real time, the one or more social messages, in response to receiving the one or more messages from the social networking messaging component 110-4. Additionally, the graphical elements intent component 190-3 may analyze, in near real time, the one or more social messages as the one or more messages are transmitted to the social networking messaging component 110-4. Furthermore, the graphical elements intent component 190-3 may analyze, in near real time, the one or more social messages, in response to receiving one or more terms or phrases of each social message as the one or more terms or phrases of each social message are incrementally inputted, such as, for example, incrementally inputted into a messaging application 124-1-1 via a message input UI element (e.g., message input UI element 314 of FIG. 3, etc.) and an on-screen virtual keyboard (e.g., on screen keyboard 340 of FIG. 3, etc.).

In some embodiments, graphical elements intent component 190-3 may be configured by the the graphical elements rendering component 190-2 to emphasize one or more terms, phrases, and/or symbols that match the one or more terms, phrases, and/or symbols associated with one or more communication intent clusters. In one non-limiting example, the graphical elements intent component 190-3 may configure graphical elements rendering component 190-2 to render and visually present one or more graphical elements recommendation UI elements for one or more terms, phrases, and/or symbols that matches the one or more one or more terms, phrases, and/or symbols associated with one or more communication intent clusters. Moreover, the graphical elements intent component 190-3 may configure graphical elements rendering component 190-2 to render the selectable graphical elements recommendation UI elements substantially near or on top (e.g., on top in a semi-transparent high contrast color) the one or more terms, phrases, and/or symbols that matches the one or more one or more terms and/or phrases associated with one or more communication intent clusters. Additionally, to emphasize the one or more matching term and/or phrase, the one or more selectable graphical elements recommendation UI elements may, for example, highlight the matching terms, phrases and/or symbols, underline matching terms, phrases and/or symbols, or otherwise emphasize the matching terms, phrases and/or symbols in one or more received, transmitted, and/or inputted social messages.

The graphical elements input component 190-4 may be generally arranged to provide user input information which may include, but is not limited to, one or more gestures and provide character input information utilizing one or more components of the mobile device 102-1 (e.g., touch sensitive display component 182). In some embodiments, the graphical elements input component 190-4 may be configured to receive touch input information from the touch sensitive display component 182 and determine one or more finger gestures based at least partially on the received touch input information. In some embodiments, the graphical elements input component 190-4 may be configured to provide user input information including the character input information to the based on one or more characters inputted by a user utilizing an on-screen virtual keyboard visually presented on at least a portion of the display device 168. Moreover, the character input information may be determined based at least partially on one or more contacts detected in a predefined region associated with the on-screen virtual keyboard.

In some embodiments, the graphical elements input component 190-4 may be further configured to detect a selection finger gesture to select a selectable UI element based at least partially on the received touch input information, the received touched input information may include, but is not limited to, finger contact at a first location in a predefined region associated with the UI element visually presented on the display device 168 for a predefined time period (e.g., less than one second), and termination of the finger contact at the first location of the predefined region.

In some embodiments, the graphical elements input component 190-4 may be also configured to detect a scroll finger gesture to scroll a scrollable UI element and/or scrollable UI view based at least partially on the received touch input information, the received touched input information may include, but is not limited to, finger contact at a first location in a predefined region associated with the scrollable UI element and/or scrollable UI view visually presented on the display device 168, initiating movement of the finger contact within a predefined time period after the finger contact (e.g., less than one second), continuous movement of the finger contact from the first location to a second location in at least one direction (e.g., up direction, down direction, left direction, right direction, or any combination thereof), and termination of the finger contact at the second location.

In some embodiments, the graphical elements input component 190-4 may be further configured to detect a movement finger gesture to move a moveable UI element from a first position to a second position based at least partially on the received touch input information. Furthermore, detecting the movement finger gesture may include, but is not limited to detecting a starting movement finger gesture to begin the movement of a moveable UI element and an ending movement finger gesture to end the movement of the moveable UI element.

In some embodiments, the graphical elements input component 190-4 may be also configured to detect the starting movement finger gesture based on the received touch input information which may include, but is not limited to, finger contact at the first location in a predefined region associated with the moveable UI element visually presented on the display device 168. The graphical elements input component 190-4 may be configured to detect the ending movement finger gesture based on the received touch input information which may include, but is not limited to, finger contact from the first location to the second location in one direction, and termination of the finger contact at the second location after movement of the finger contact.

In some embodiments, the graphical elements input component 190-4 may be further configured to detect an edit finger gesture to begin editing an editable UI element (e.g., modifying, color, shape, add text, remove text, add new features, etc.) based at least partially on the received touch input information. Furthermore, detecting the edit finger gesture finger gesture which may include, but is not limited to, finger contact at a location in a predefined region associated with the editable UI element visually presented on the display device 168 for a predefined time period (e.g., two seconds, three seconds, etc.) and detecting termination of the contact at the location after the predefined time period.

It may be appreciated that in some embodiments, UI elements and/or UI views may be configured as selectable, moveable, editable, and/or scrollable, and the graphical elements input component 190-4 may be configured to determine the respective finger gesture based at least partially on the received touch input information.

The graphical elements management component 190-1 be generally arranged to provide management of one or more illustrated graphical UI elements for rendering and or visual presentation on display device 168. To provide context sensitive illustrated graphical UI elements management, the graphical elements management component 190-1 may be generally arranged to request list of recommended graphical element identifier information (e.g., list of recommended graphical element identifier information 230 of FIG. 2A, etc.) from the social networking graphical elements component 110-3. After receiving the list of recommended graphical element identifier information, the graphical elements management component 190-1 may be arranged to render and visually present one or more illustrated graphical UI elements identified in the list of recommended graphical element identifier information for sharing with one or more users (e.g., shared as one or more social messages, etc.) via the social networking system 101.

In some embodiments, the graphical elements management component 190-1 may be configured to request the one or more components of the messaging application 124-1-1 (e.g., a selection of a UI element graphical elements input component 190-4) to transmit one or more illustrated graphical UI elements for sharing with one or more users in a conversation comprising between one or more users. The request may include, but is not limited to, graphical element identifier information identifying the illustrated graphical element for transmission to one or more users in one or more social messages. In response to the request, the graphical elements management component 190-1 may be configured to request the one or more components of the messaging application 124-1-1 transmit the graphical element identifier information to the social networking messaging component 110-4 for transmission to one or more users. Additionally, the graphical elements management component 190-1, may also be configured to request the one or more components of the messaging application 124-1-1 to render and visually present the illustrated graphical UI element identified by the graphical element identifier information in a message history UI element (e.g., message history UI element 316 of FIG. 3, etc.).

Figure 2A:
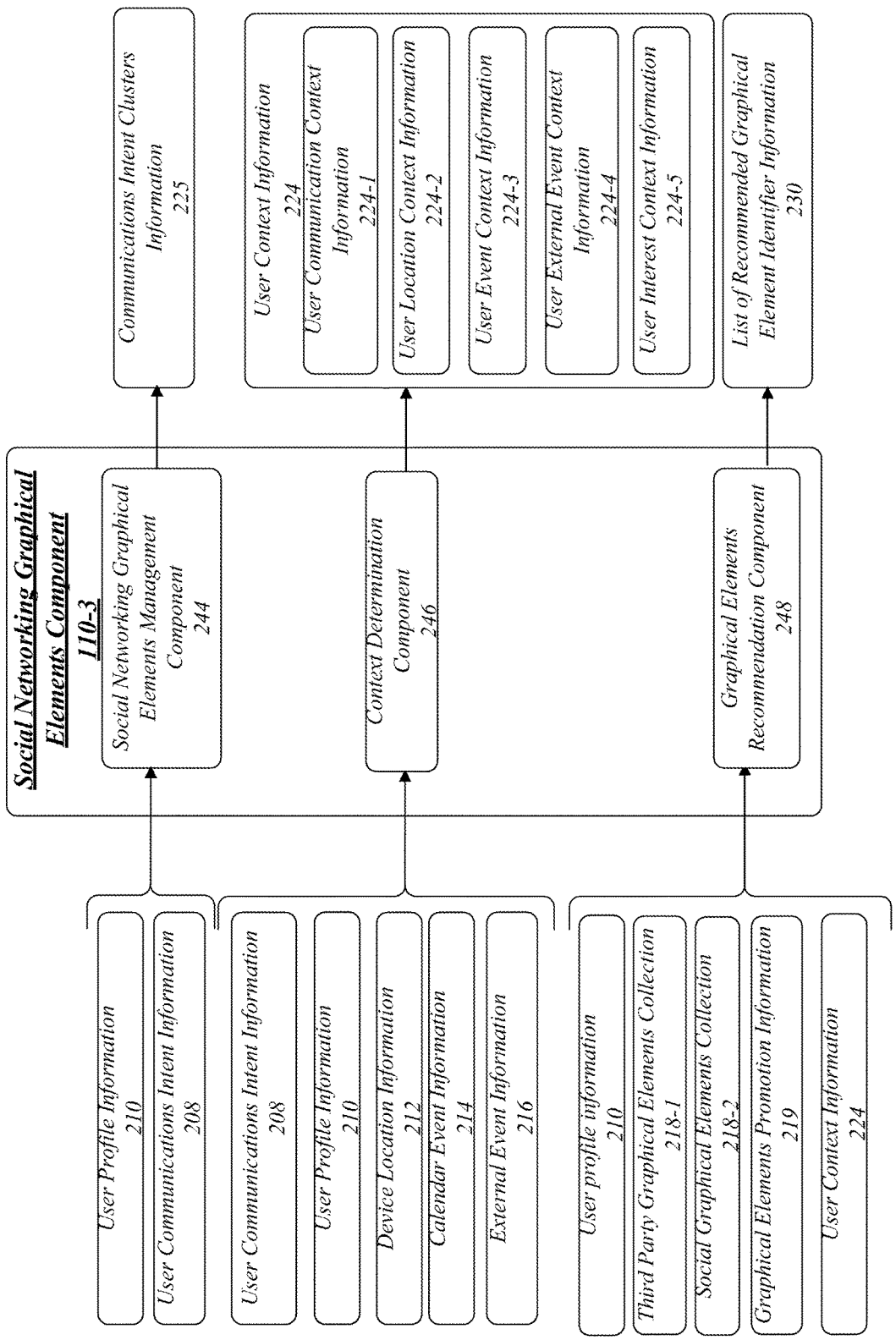
FIG. 2A illustrates an operating environment of a social networking graphical elements component.
Figure 3:
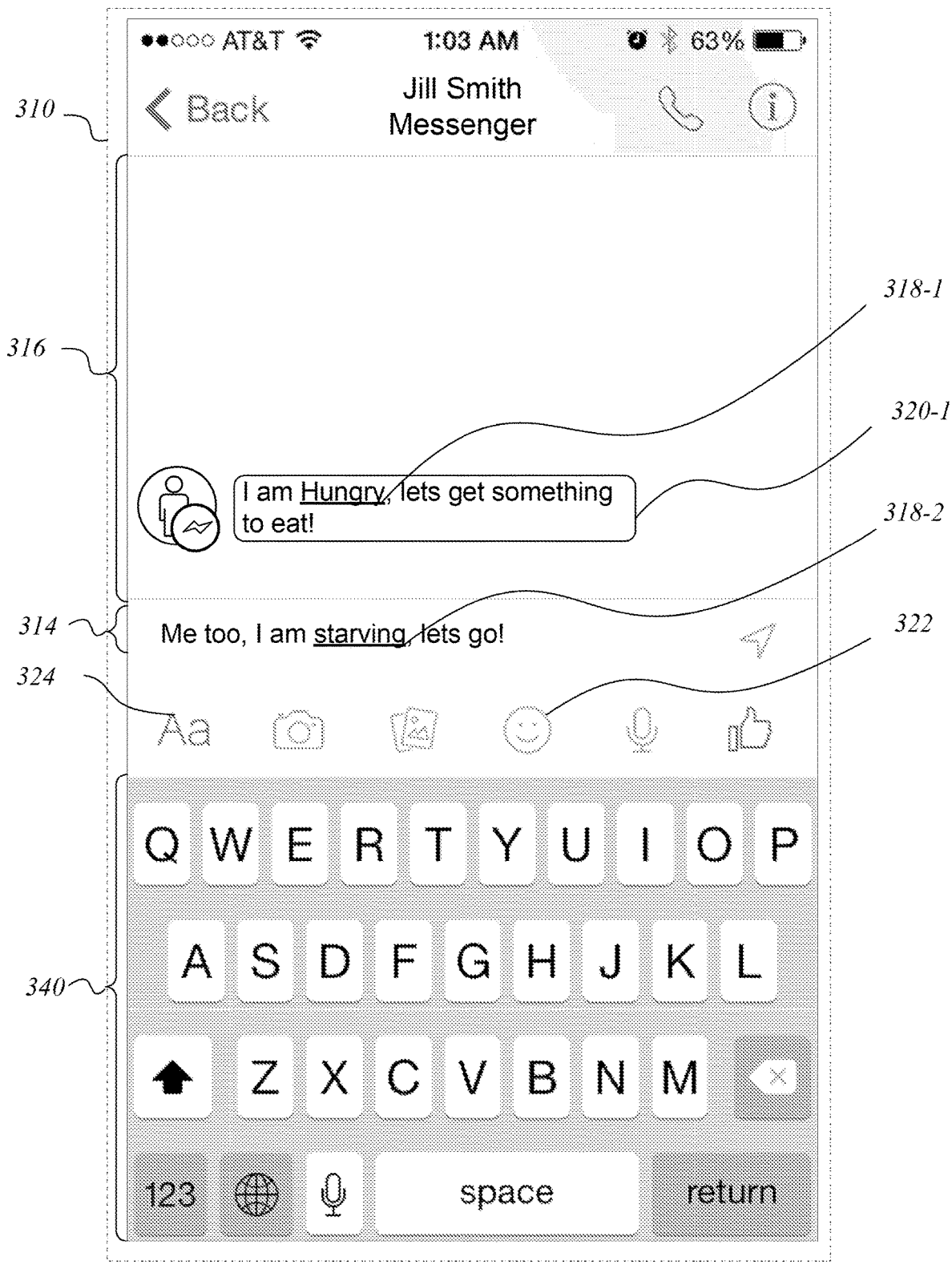
FIG. 3 illustrates a graphical elements message input user interface view before receiving at least a portion of a social message.

In some embodiments, the graphical elements management component 190-1 may be configured to receive a request from the one or more components of the messaging application 124-1-1 (e.g., a selection of a selectable UI element such as, for example, selectable graphical elements recommendation UI element 318-1 and 318-2 of FIG. 3, as detected by graphical elements input component 190-4) to visually present one or more illustrated graphical UI elements associated with a user's intent in a social message for sharing with one or more users. The request may include, but is not limited to, a user's intent represented by user communications intent information (e.g., user communications intent information 208 of FIG. 2A), which may include, but is not limited to, one or more terms, short phrases, and/or symbols identifying a user's intent for a particular social message. In response to the request to visually present one or more illustrated graphical UI elements, the graphical elements management component 190-1 may request a list of recommended graphical element identifier information from the social networking graphical elements component 110-3.

To provide users with illustrated graphical UI elements applicable to not only a user's intent as represented in the user communications intent information but also a user's context, in some embodiments, the request for the list of recommended graphical element identifier information may include, but is not limited to, the user communications intent information (e.g., one or more terms, short phrases, and/or symbols identifying a user's intent), device location information for identifying the current location (e.g., longitude, latitude, and/or altitude coordinates, etc.) of a device being used by a user to send and/or receive one or more social messages such, as for example, mobile device 102-1, and/or calendar event information (e.g., one or more calendar events associated with calendar application 124-1-6) for identifying one or more calendar events stored on a device being used by a user to send and/or receive one or more social messages such as, for example, mobile device 102-1. In response to the request, the graphical elements management component 190-1 may receiving the list of recommended graphical element identifier information, where each graphical element identifier information may include, but is not limited to, at least one illustrated graphical element identifier that may identify a particular illustrated graphical UI element stored in the graphical elements datastore 112-3 or locally stored in a local graphical elements datastore (not shown) in the system memory and/or storage component of a device (e.g., system memory 120 and/or storage component 150 of mobile device 102-1) as illustrated graphical element information.

The illustrated graphical element information associated with an illustrated graphical UI element may include, but is not limited to, graphical element identifier information (e.g., a graphical element identifier that uniquely identifies a particular illustrated graphical UI element), graphical element name information (e.g., the name of illustrated graphical UI element), graphical element commercialization information (e.g., cost associated with the illustrated graphical UI element, promotional information such as promotions and/or discounts in the form of discount barcodes associated with sharing the illustrated graphical UI element, etc.), graphical element rendering information (e.g., the information for rendering the illustrated graphical UI element for visual presentation on a display device), graphical element source information (e.g., the affiliate, sponsor, associated entity, and/or source of the illustrated graphical UI element), graphical element set information (e.g., the one or more groups, sets, or packs that a particular illustrated graphical UI element is part of or belongs to), graphical element popularity information (e.g., the number of times the illustrated graphical UI element has been shared between and among all users in the social networking system in one or more set time periods, the user identifier information that shared the illustrated graphical UI element in those set time periods), machine learned graphical element context information (e.g., one or more context terms identified by machine learning based at least partially on selection of one or more illustrated graphical UI elements and users' intent when selecting the one or more illustrated graphical UI elements), and/or predetermined graphical element context information (e.g., one or more context terms for identifying the appropriate context generally assigned by the affiliate, sponsor, associated entity and/or source of the illustrated graphical UI element).

To render and visually present graphical element preview UI element (e.g., the graphical element preview UI element 410) including one or more illustrated graphical UI elements, the graphical elements management component 190-1 may be further configured to request and receive illustrated graphical element information for each illustrated graphical UI element identified by the illustrated graphical element identifier in each graphical element identifier information. Moreover, the graphical elements management component 190-1 may be configured to request and receive illustrated graphical element information for one or more illustrated graphical UI elements not already stored in a local graphical elements datastore (not shown) stored in the system memory 120 and/or storage component 150 from the social networking graphical elements component 110-3.

In order to conserve bandwidth and/or limit the amount of information received when a mobile device such as mobile device 102-1 is connected to the communication network 103 that may restrict the amount of bandwidth and/or amount of data transferred to and from the mobile device, the graphical elements management component 190-1 may vary the number of illustrated graphical UI elements represented by illustrated graphical element information requested and received may vary for a mobile device, such as, for example, mobile device 102-1 based at least partially on the communication connection type information generated by the communications component 158 of the mobile device 102-1.

In one non-limiting example, the graphical elements management component 190-1 may be configured to request and receive some or even all of illustrated graphical UI elements and associated illustrated graphical element information identified in the received list of recommended graphical element identifier information, when communication connection type information indicates that the communication connection type is Wifi connection type i.e., the mobile device is connected using wireless IEEE 802.11.

In another non-limiting example, the graphical elements management component 190-1 may be configured to request and receive a fewer or limited number of illustrated graphical UI elements and associated illustrated graphical element information identified in the received list of recommended graphical element identifier information, when communication connection type information indicates that the communication connection type is cellular connection type, i.e., the mobile device is connected using cellular communication standards and accordingly, may have a limit or restrictions on bandwidth and/or amount of data transferred to and from the mobile device.

After a sufficient number of illustrated graphical element information has been requested and received (e.g., sufficient number of illustrated graphical element information to render and visually present the graphical element preview UI element 410 in the graphical elements preview UI view 400, etc.), the graphical elements management component 190-1 may configure the graphical elements rendering component 190-2 to render and visually present one or more illustrated graphical UI elements (e.g., recommended illustrated graphical UI elements 410-1, 410-2, 410-3, etc.) in the graphical element preview UI element.

Additionally or alternatively, in some embodiments, the graphical elements management component 190-1 may also be configured to receive a request from the one or more components of the messaging application 124-1-1 (e.g., a selection of a UI element as detected by graphical elements input component 190-4) to visually present one or more illustrated graphical UI elements that the user has recently used, purchased, and/or owned. In embodiments where a request is received for recently used illustrated graphical UI elements, the graphical elements management component 190-1 may configure the graphical elements rendering component 190-2 to render and visually present one or more illustrated graphical UI elements the user has recently used based at least partially on user illustrated graphical elements usage information and cached illustrated graphical element information stored in a local graphical elements datastore (not shown) in system memory and/or storage component of a device (e.g., system memory 120 and/or storage component 150 of mobile device 102-1) used by the user.

In embodiments where a request is received for purchased or otherwise owned illustrated graphical UI elements, the graphical elements management component 190-1 may configure the graphical elements rendering component 190-2 to render and visually present one or more illustrated graphical UI elements the user has owned based at least partially on user illustrated graphical elements ownership information and cached illustrated graphical element information stored in a local graphical elements datastore (not shown) in system memory and/or storage component of a device (e.g., system memory 120 and/or storage component 150 of mobile device 102-1) used by the user.

It may be appreciated that in instances when the local graphical elements datastore (not shown) does not contain all the recently used, purchased, and/or owned illustrated graphical UI elements, the graphical elements management component 190-1 may be configured to request and receive illustrated graphical element information representative of illustrated graphical UI elements that the local graphical elements datastore does not already store or otherwise contain, i.e., non-cached illustrated graphical UI elements from the social networking graphical elements component 110-3.

In some embodiments, the illustrated graphical UI elements in one or more UI views (e.g., may be freely available to a user for sharing via messaging application 124-1-1) as indicated by the associated graphical element commercialization information for each illustrated graphical UI element. In other embodiments, the one or more illustrated graphical UI elements in one or more UI views (e.g., graphical elements preview UI view 400, etc.) may have a cost or price associated with an illustrated graphical UI element for purchase by a user as indicated by the associated graphical element commercialization information. It may be appreciated that the users may purchase the one or more illustrated graphical UI elements via the messaging application 124-1-1 in one or more UI views (e.g., graphical elements preview UI view 400, etc.) of the messaging application 124-1-1 as rendered and visually presented in, for example, a graphical element purchase UI element (not shown). Additionally or alternatively, the messaging application 124-1-1 may also enable users to purchase one or more illustrated graphical UI elements in one or more packs, groups, or sets where each packs, groups, or set may include one or more related illustrated graphical UI elements.

After rendering and visually presenting one or more illustrated graphical elements in one or more UI views, the management component 190-1 may be configured, to transmit illustrated graphical element identifier information associated with a user selected illustrated graphical UI element as one or more social messages to one or more users via the social networking system 101.

In some embodiments, the messaging application 124-1-1 may be configured to receive one or more social messages including illustrated graphical element identifier information representative of one or more illustrated graphical UI elements transmitted by other users via the social networking system 101. In those embodiments, the received illustrated graphical element identifier information may identify a illustrated graphical UI element represented by illustrated graphical element information stored in a local graphical element datastore (not shown) and may be rendered and visually presented by the messaging application 124-1-1 in one or more UI views on the display device 168 of the touch sensitive display component 182.

It may be appreciated that in instances when the local graphical elements datastore (not shown) does not contain an illustrated graphical UI element identified by the received illustrated graphical element identifier information, the graphical elements management component 190-1 may be configured to request and receive illustrated graphical element information representative of illustrated graphical UI elements that the local graphical elements datastore does not already store or otherwise contain from the social networking illustrated graphical elements component 110-3.

FIG. 2A illustrates an operating environment of a social networking graphical elements component. As illustrated in FIG. 2A, the operating environment 200 may include, but is not limited to the social networking graphical elements component 110-3. The social networking graphical elements component 110-3 may include, but is not limited to, social networking graphical elements management component 244, context determination component 246, and/or graphical elements recommendation component 248.

In some embodiments, social networking graphical elements management component 244 may be configured to manage access to illustrated graphical element information for one or more users based at least partially on one or more purchases and/or requests to access one or more illustrated graphical UI elements. Moreover, the social networking graphical elements management component 244 may be configured to receive a request from graphical elements component 190 of a messaging application 124-1-1 for illustrated graphical element information representative of one or more illustrated graphical UI elements based at least partially on illustrated graphical element identifier information, retrieve the requested illustrated graphical element information from the graphical elements datastore 112-3, and provide the retrieved illustrated graphical element information to the graphical elements component 190 of a messaging application 124-1-1.

In some embodiments, the social networking graphical elements management component 244 may also be configured to analyze the messages datastore 112-1 to determine user illustrated graphical elements usage information for each user and graphical element popularity information associated with each illustrated graphical UI element.

In some embodiments, the social networking graphical elements management component 244 may also be configured to analyze to determine machine learned graphical element context information associated with each illustrated graphical UI element based at least partially on the user communications intent information 208 in one or more social messages of one or more users and the corresponding illustrated graphical element identifier information for one or more illustrated graphical UI elements that one or more users selected for transmission to one or more recipient users. Moreover, the user communications intent information 208 representative of a user's intent in a social message may be used to correlate the illustrated graphical UI element the user selected for transmission in order to determine secondary contexts that an illustrated graphical UI element may have acquired over time through use by one or more users in the social networking system 101. The social networking graphical elements management component 244 may perform the analysis by correlating numerous users' selection of graphical UI elements with the respective associated user communications intent information 208 utilizing for example, well known, machine learning clustering algorithms.

In a non-limiting example, the social networking graphical elements management component 244 may update the machine learned graphical element information associated with an illustrated graphical UI element representative of a soccer referee announcing a goal (e.g., illustrated graphical UI element 254-6) to include the context "excited", when users communications intent information 225 identifies the users' intent in one or more social messages as being "excited" and the users select the illustrated graphical UI element (e.g., illustrated graphical UI element 254-6) for transmission to one or more users via social networking system 101.

In some embodiments, social networking graphical elements management component 244 may be configured to determine communications intent clusters information 225 including one or more communication intent clusters. The social networking graphical element management component 244 may be configured to analyze user social messages information for one or more users to detect clusters of terms, phrases, and/or symbols utilizing well known natural language processing algorithms and correlating the one or more clusters of terms phrases, and/or symbols into an intent of a user represented by one or more terms, a short phrase, and/or symbols, based at least partially on in one or more user profile information 210 (e.g., user social messages information, etc.).

In some embodiments, the social networking graphical elements management component 244 may be configured to continuously or periodically update the communications intent clusters information 225, and provide the communications intent clusters information 225 as requested by one or more applications of one or more devices (e.g., messaging application 124-1-1 of mobile device 102-1).

In some embodiments, including, but not limited to, embodiments where illustrated graphical UI elements may be sponsored, the social networking graphical elements management component 244 may be configured to provide promotional information (e.g., provide promotional information via e-mail, social messages, profile activities, etc.) which may include, promotions and/or discounts in the form of discount barcodes (e.g., QR codes, etc.) to one or more users, based at least partially on graphical element commercialization information associated with each illustrated graphical UI element. Moreover, the graphical element commercialization information may indicate that a user sharing the associated illustrated graphical UI element with one or more recipient users and/or the one or more recipient users receiving the associated illustrated graphical UI element may receive promotions and/or discounts as indicated in the graphical element commercialization information for that illustrated graphical UI element.

In those embodiments, the social networking graphical elements management component 244 may be configured to provide the promotional information associated with an illustrated graphical UI element to a user and/or one or more recipient users, when the user shares the illustrated graphical UI with the one or more recipient users via one or more social messages and/or profile activities. It may be appreciated that the user sharing the illustrated graphical UI element and/or the one or more recipient users may receive the same promotional information or different promotional information based on the commercialization information associated with each illustrated graphical UI element. This may empower users to purchase and/or share one or more illustrated graphical UI elements while receiving discounts and/or promotions associated with sharing illustrated graphical UI elements.

In some embodiments, social networking graphical elements management component 244 may also be configured to request the determination of a user context information 224 and/or a list of recommended graphical element identifier information 230 by the context determination component 246 and the graphical elements recommendation component 248, respectively, for a user having an associated user profile information 210, in response to receiving a request from a graphical elements component 190 of a messaging application 124-1-1 for the list of recommended graphical element identifier information 230 and for the user. The social networking graphical elements management component 244 may also be configured to provide the list of recommended graphical element identifier information 230 to the user having the associated user profile information 210.

In some embodiments, the context determination component 246 may be configured to determine user context information 224 for a particular user based at least partially on user profile information 210 (e.g., user interest information, user group membership information, user social messages information, user biographic and/or demographic information, user event information, user search information, etc.), device location information 212, and/or any other information associated with a user's presence within the social networking system 101.

The user context information 224 may include, but is not limited to, at least one user context represented by user communication context information 224-1, user location context information 224-2, user event context information 224-3, user external event context information 224-4, user interest context information 224-5, and/or any other user context information that may be determined based at least partially on a user's presence within the social networking system 101.

In some embodiments, the user location context information 224-2 may identify at least one user location context, which may include, but is not limited to, one or more approximate locations (e.g., one or more points of interests within a circular shaped geo-fence having a specific radius such as 100 feet, 500 feet, 1000 feet, etc.) for a mobile device (e.g., mobile device 102-1) associated with a user, which may be determined by the context determination component 246 based at least partially on device location information 212, user profile information 210 (e.g., user biographic and/or demographic information, user event information, etc.), and/or calendar event information 214. In one non-limiting example, user location context information 224-2 may indicate that a user is currently located at a "McDonald's" with an associated address of "1060 N. Rengstorff Ave., Mountain View, Calif. 94043." In another non-limiting example, the user location context information 224-2 may indicate the user is currently located at "Home" with an associated address or at "Work" with an associated address. In yet another non-limiting example, user location context information 224-2 may indicate that the user may be currently at a "Birthday Party Event" with an associated address.

In some embodiments, the user event context information 224-3 may identify at least one user event context which may include, but is not limited to, one or more current events that the user intends to participate, the location of that event, and the number of users who are socially connected to the user that are also intending to participate or is currently participating, which may be determined by the context determination component 246 based at least partially on calendar event information 214, device location information 212, and/or user profile information 210 (e.g., user event information, etc.) associated with one or more users. In one non-limiting example, the user event context information 224-3 may indicate that the user intends to attend a "Birthday Party Event" at an associated address and two of the user's friends are also intending to attend.

In some embodiments, user interest context information 224-5 may identify at least one user interest context which may include, but is not limited to, one or more current interests (e.g., favorite artists, favorite movies, favorite music, favorite books, favorite sports, favorite locations, favorite food, etc.) of a user, which may be determined by the context determination component 246 based at least partially on the user profile information 210 (e.g., user interest information, user search information, user biographic and/or demographic information, user event information, user group membership information, etc.) and/or calendar event information 214.

In one non-limiting example, the interest context information may identify a user who shows an interest for a particular artist such as "Pink Floyd", when a user lists the particular artist as one of their favorite artists based on user interest information, is a member of one or more groups associated with a particular artist or that genre of music by the particular artist based on the user group membership information, is located within the same hometown as the particular artist based on the user biographic and/or demographic information, intends to attend an event by that particular artist based at least partially on user profile information 210 (e.g., user event information, etc.) and/or calendar event information 214, and/or is frequently searched by the user in the social networking system 101 based at least partially on user profile information 210 (e.g., user search information, etc.).

In some embodiments, user communication context information 224-1 may identify at least one current or recent user communication context which may include, but is not limited to, the intent of the user in a social message being transmitted to one or more users as identified in the user communications intent information 208. Additionally, the user communication context information 224-1 may also identify the social relationship with respect to the one or more users, which may be determined by the context determination component 246 based at least on user social messages information and/or user social connections information. Furthermore, the context determination component 246 may also identify a current conversation topic by optionally analyzing one or more social messages to identify one or more "triggers" such as, for example, one or more keywords and/or other content. In one non-limiting example, the user communication context information may identify that the user's intent is "hungry" and is currently or was recently discussing about art galleries with another user in the social networking system 101 who is identified as their spouse.

In some embodiments, user external event context information 224-4 may identify at least one user external event context which may include, but is not limited to, one or more current external events in one or more regions associated with the user's current location which may be determined by the context determination component 246 by retrieving information from one or more network accessible sources (e.g., websites such as Wikipedia, datastores, etc.) utilizing one or more APIs of the one or more network accessible sources. These current events may include, but is not limited to, weather events for indicating the current weather (e.g., sunny, partly cloudy, rain, thunderstorm, snow, etc.) and associated temperature with respect to the user's location, sports events for indicating the current local sports and/or global sports games currently being played (e.g., a World Cup Soccer Game currently being played between Germany and Argentina, etc.), holiday events for indicating the current holiday (e.g., Christmas, Halloween, Veterans Day, etc.) or any other events that may be common to some or all users within one or more regions associated with the user's current location.

In some embodiments, after the context determination component 246 determines the user context information 224, the graphical elements recommendation component 248 may be configured to determine a list of recommended graphical element identifier information 230. As discussed above and elsewhere, each recommended graphical element identifier information in the list of recommended graphical element identifier information 230 may include at least one illustrated graphical element identifier that identifies at least one illustrated graphical UI element stored in the graphical elements datastore 112-3 and utilized by the graphical elements component 190 to render and/or visually present one or more UI views (e.g., graphical element messaging UI view, etc.) including one or more illustrated graphical UI elements.

In some embodiments, the graphical elements recommendation component 248 may be configured to generate a list of recommended graphical element identifier information including one or more illustrated graphical element identifiers based at least partially on third party graphical elements collection 218-1, social graphical elements collection 218-2, graphical elements promotion information 219, user profile information 210 (e.g., user illustrated graphical elements ownership information, user illustrated graphical elements usage information, etc.), and/or the user context information 224.

The third party graphical elements collection 218-1 may include, but is not limited to, illustrated graphical element information representative of illustrated graphical UI elements that are associated with third party entities (e.g., entities that do not operate the social networking system 101) such as, for example, Starbucks™, McDonald™, Disney™, or any other third party entity based at least partially on graphical element source information.

The social graphical elements collection 218-2 may include, but is not limited to, illustrated graphical element information representative of illustrated graphical UI elements that are associated with the social networking system 101 (e.g., entities that operates the social networking system 101) such as, for example, Facebook™, LinkedIn™ MySpace™, or any other social networking entity based at least partially on graphical element source information.

In some embodiments, the graphical elements recommendation component 248 may be configured to select at least one illustrated graphical UI element from the one or more illustrated graphical UI elements included in third party graphical elements collection 218-1 and/or social graphical elements collection 218-2. The graphical elements recommendation component 248 may select the at least one illustrated graphical UI element by searching the third party graphical elements collection 218-1 and/or the social graphical elements collection 218-2 for at least one illustrated graphical UI element having predetermined graphical element context information including one or more context terms that approximately matches the one or more contexts indicated in the user context information 224 (e.g., at least one context term matches at least one context).

To provide users with illustrated graphical UI elements that have acquired secondary context through frequent use by one or more users, the graphical elements recommendation component 248 may also select the at least one illustrated graphical UI element by searching the third party graphical elements collection 218-1 and/or the social graphical elements collection 218-2 for at least one illustrated graphical UI element having machine learned graphical element context information including one or more context terms that approximately matches the one or more contexts indicated in the user context information 224 (e.g., at least one context term matches at least one context).

In one non-limiting example, the graphical elements recommendation component 248 may be configured to select an illustrated graphical UI element representative of holiday themed illustrated graphical UI element including two illustrated mice holding forks with empty plates (e.g., illustrated graphical UI element 254-4) having a predetermined graphical element context information context information with one or more terms indicating that associated context for the illustrated graphical UI element includes, but is not limited to, "hungry", "starving", "holiday", and/or "Christmas", when the user communications context information 224-1 indicates that the user's intent is hungry in a social message that is currently being inputted for transmission to the user's spouse, and external event context information 224-4 indicates that the current day is or near a holiday (e.g., within two weeks before Christmas, thanksgiving, etc.) for a location and local time associated with the mobile device 102-1 of the user.

In another non-limiting example, the graphical elements recommendation component 248 may be configured to select an illustrated graphical UI element representative of a hand holding flowers (e.g., illustrated graphical UI element 254-2) having a predetermined graphical element context information with one or more terms indicating that associated context for the illustrated graphical UI element includes, but is not limited to, "love" and/or "flowers", when the user communications context information 224-1 indicates that the user's intent is love in a social message that is currently being inputted for transmission to the user's spouse.

In another non-limiting example, the graphical elements recommendation component 248 may be configured to select an illustrated graphical UI element representative of a referee announcing a goal (e.g., illustrated graphical UI element 254-6) having machine learned graphical element context information indicating that associated context for the illustrated graphical UI element includes but is not limited to "excited", when the user communications context information 224-1 indicates that the user's intent in a social message that is currently being inputted for transmission to the user's spouse is excited. It may be appreciated that the illustrated graphical element 254-6 may have a predetermined graphical element context information with one or more terms indicating that associated context for the illustrated graphical UI element includes, but is not limited to, "goal", "soccer", and/or "score", however, through frequent use of the illustrated graphical element 254-6 by one or more users with intent of excited in one or more social messages, the machined learned context graphical element context information may include the context "excited".

In some embodiments, the graphical elements recommendation component 248 may be configured to bias the selection of illustrated graphical UI elements by limiting the selection of illustrated graphical UI elements from the third party graphical elements collection 218-1 to selecting only or exclusively illustrated graphical UI elements having graphical element source information and/or graphical element context information that are identified in the graphical elements promotion information 219. Moreover, the graphical elements promotion information 219 may include, but is not limited to promotion source information and promotion context information. The promotion source information may include, but is not limited to, one or more affiliates or sponsors (e.g., commercial entities, non-profit entities, government entities, etc.) that may have provided incentives (e.g., paid financial incentives) and/or pecuniary interests to the operators of the social networking system 101 and may correspond to one or more promotion contexts represented by promotion context information for a particular context the affiliates or sponsor is interested in promoting (e.g., movies, music, stores, websites, etc.). This may enable affiliates or sponsors to promote their illustrated graphical UI elements in a particular context (e.g., National Football League (NFL) promoting their football themed illustrated graphical UI elements, etc.) as a means of increasing brand recognition by advertisement via sharing of one or more sponsored illustrated graphical UI elements.

After selecting one or more illustrated graphical UI elements, in the graphical elements recommendation component 248 may be configured to sort and/or rank the one or more selected illustrated graphical UI elements based at least partially on popularity of one or more illustrated graphical UI elements. In some embodiments, the graphical elements recommendation component 248 may be configured to sort and/or rank by starting with the most popular illustrated graphical UI elements in a set time period (e.g., one day, one week, one month, one year, all time, etc.) for a particular geographic location (e.g., in United States, Canada, California, San Francisco, etc.) based at least on the graphical element popularity information associated with each illustrated graphical UI element that were selected. Moreover, the graphical element popularity information may include, but is not limited to, values indicating the number of times a particular illustrated graphical UI element has been transmitted, received, and/or otherwise shared between and among users in a set time period such as, for example, one day, one week, one month, one year, all time, and/or any other set time period. Additionally, based at least partially on the user profile information (e.g., user location information, etc.) identified by the graphical element popularity information (e.g., user profile identifier information included in the graphical element popularity information) for users that shared the selected illustrated UI element, the graphical elements recommendation component 248 may also determine the popularity of illustrated graphical UI elements for a particular geographic location, such as, for example, continents, nations, counties, provinces, cities, and/or any other geographical boundaries. Accordingly, by sorting and/or ranking the selected illustrated graphical UI elements based at least partially on the graphical element popularity information associated with each selected illustrated graphical UI element for a set time period and geographic location, a user may be visually presented with the popular illustrated graphical UI elements first in one or more UI views (e.g., in the graphical element preview UI element 410 of graphical elements preview UI view 400).

Additionally or alternatively, in some embodiments, the graphical elements recommendation component 248 may be configured to utilize well known machine learning algorithms to determine popularity of illustrated graphical UI elements between and among users having particular user profile information 210 (e.g., user demographic and/or biographic information, user interest information, etc.). Moreover, based at least partially on the user profile information (e.g., user location information, etc.) identified by the graphical element popularity information (e.g., user profile identifier information included in the graphical element popularity information) for users that shared the selected illustrated UI element, the graphical elements recommendation component 248 may determine an ideal collection of biographic, demographic, and/or interest information for a user that is very likely to share the selected illustrated graphical UI element, i.e., an ideal graphical element profile information utilizing well know machine learning algorithms.

The graphical elements recommendation component 248 may then determine user profile based graphical element popularity information for each selected illustrated graphical UI element by comparing the user profile information 210 (e.g., user demographic and/or biographic information, user interest information, etc.) with the ideal graphical element profile information to determine a popularity value or coefficient (e.g., a normalized value from 1 to 100 where 100 being the most popular, etc.) of how likely the user having the user profile information 210 is predicted to share the illustrated graphical element. The closer (e.g., share a great percentage of interests, biographic and/or demographic information, etc.) the user profile information 210 is compared to the ideal graphical element profile information the higher the popularity value or coefficient. This may enable the graphical elements recommendation component 248 to sort and rank illustrated graphical UI elements for the user having specific user profile information 210, such as, for example, a user having user demographic and/or biographic information indicating that the user is a male between the age of 18 and 25 and user interest information indicating that the user likes music artist "Pink Floyd".

After determining user profile based graphical element popularity information, the graphical elements recommendation component 248 may then sort and/rank by starting with the most popular illustrated graphical UI elements, including, but is not limited to, illustrated graphical UI elements that are sponsored by affiliates or sponsors (e.g., commercial entities such as "NFL", etc.) based at least partially on the user profile based graphical element popularity information and/or the graphical element popularity information associated with each selected illustrated graphical UI element. This may enable the graphical elements recommendation component 248 to provide the most popular illustrated graphical UI elements for a user having specific user profile information 210 (e.g., a male between age 18 and 25 that likes "Pink Floyd") first before the less popular illustrated graphical UI elements.

Additionally or alternatively, the graphical elements recommendation component 248 may be configured to sort and/or rank the selected illustrated graphical UI elements based at least partially on user profile information 210 and in particular, user illustrated graphical elements ownership information and/or user illustrated graphical elements usage information. Moreover, the graphical elements recommendation component 248 may be configured to sort and/or rank a predetermined number (e.g., 1, 2, 3, etc.) of selected illustrated graphical UI elements to the front of the list (e.g., a fixed number of spots) for any selected illustrated graphical UI elements that are promoted by an affiliate or sponsor as indicated by the graphical elements promotion information 219, i.e., promoted recommended illustrated graphical UI elements. This may be followed by a predetermined number of selected illustrated graphical UI elements that the user does not already own as indicated by the user illustrated graphical elements ownership information, i.e., unowned recommended illustrated graphical UI elements. This may be further followed by a predetermined number of selected illustrated graphical UI elements that the user has recently used as indicated by the user illustrated graphical elements usage information, i.e., recently used recommended illustrated graphical UI elements. Finally, the remaining selected illustrated graphical UI elements regardless of promotions, ownership, and/or recent use i.e., remaining recommended illustrated graphical UI elements.

In a non-limiting example, the list of recommended graphical element identifier information 230, may include one or more fixed sized groups at the front or top of the list. Each group may include a predetermined number of illustrated graphical element identifier information. The first group which may be at the front or top of the list may include, but is not limited to, illustrated graphical element identifier information to identify a predetermined number (e.g., 2) of promoted recommended illustrated graphical UI elements. The second group after the first group may include, but is not limited to, illustrated graphical element identifier information to identify a predetermined number (e.g., 2) of unowned recommended illustrated graphical UI elements. The third group after the second group may include, but is not limited to, illustrated graphical element identifier information to identify a predetermined number (e.g., 2) of recently used recommended illustrated graphical UI elements. The fourth group after the third group, may include, but is not limited to, illustrated graphical element identifier information to identify the remaining recommended illustrated graphical UI elements. This may assist users in the management of illustrated graphical UI elements that user already owns and promote illustrated graphical UI elements that the user does not already own or illustrated graphical UI elements that are being promoted by an affiliate or sponsor.

In some embodiments, after the graphical elements recommendation component 248 has selected, sorted, and/or ranked the illustrated graphical UI elements based at least partially on user profile information 210, user context information 224, and/or graphical elements promotion information 219, the graphical elements recommendation component 248 may generate the list of recommended graphical element identifier information, where each graphical element identifier information may include an illustrated graphical element identifier corresponding to a selected, sorted, and/ranked illustrated graphical UI element. Additionally, in instances when the selected illustrated graphical UI elements are sorted and/or ranked, the most popular recommended illustrated graphical UI elements may be placed in the front of the list or front of their respective groups in a descending order in accordance with the above discussion.

In some embodiments, after the list of recommended graphical element identifier information has been generated, the social networking graphical elements management component 244 may transmit the generated list of recommended graphical element identifier information 230 to the device utilized by the user that requested the list of recommended illustrated graphical element identifier information, such as, for example, mobile device 102-1

Figure 2B:
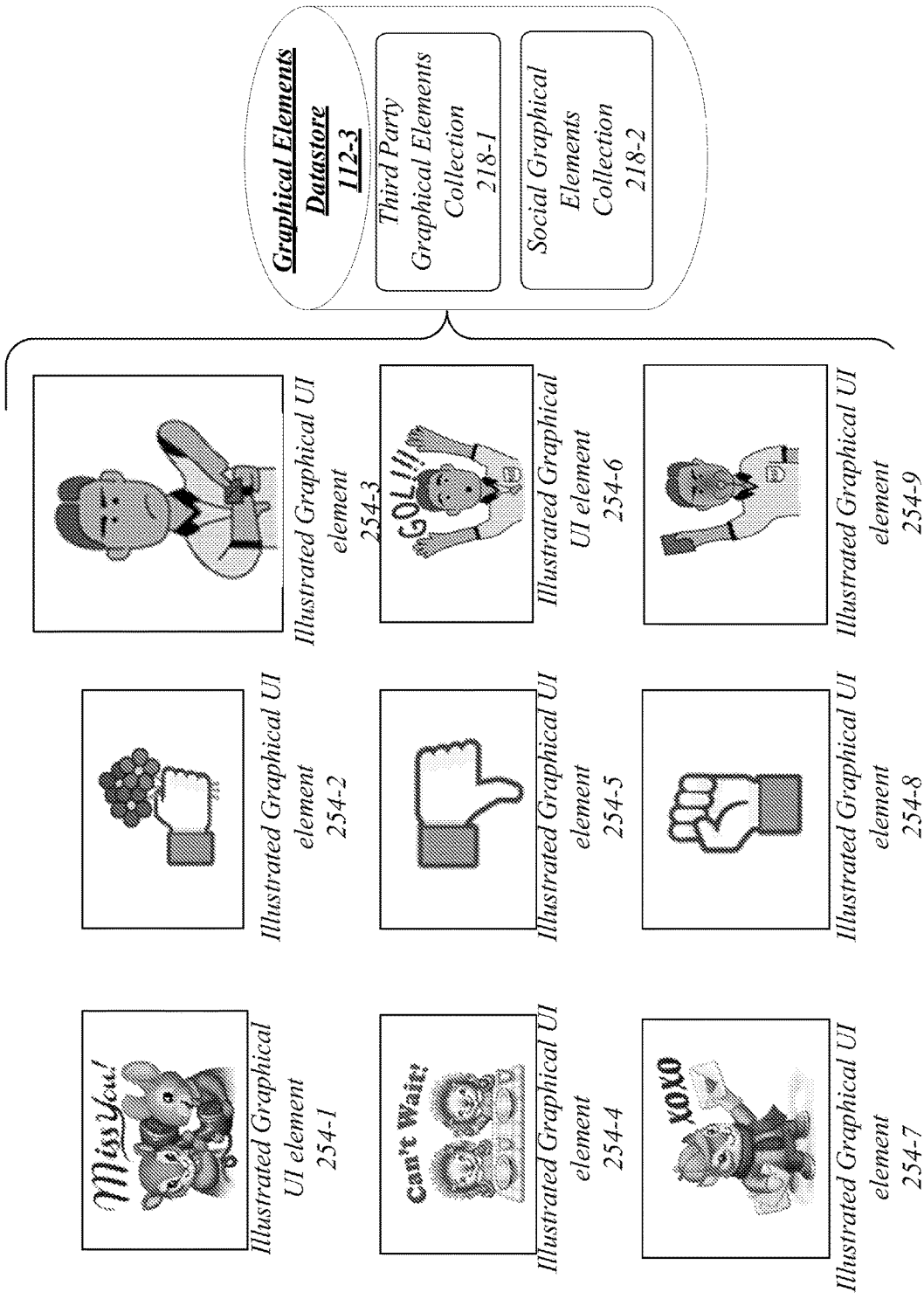
FIG. 2B illustrates an operating environment of illustrated graphical user interface elements stored in graphical elements datastore.

FIG. 2B illustrates an operating environment 250 of one or more illustrated graphical UI elements stored in graphical elements datastore 112-3. As illustrated in FIG. 2B, the graphical elements datastore 112-3 which may include, but is not limited to, third party graphical elements collection 218-1 and/or social graphical elements collection 218-2. As discussed above and/or elsewhere, third party graphical elements collection 218-1 and/or social graphical elements collection 218-2 may each include but is not limited to illustrated graphical element information representative of one or more illustrated graphical UI elements 254-e.

It may be appreciated that while not illustrated, one or more of the illustrated graphical UI elements 254-e may be animated (e.g., animated gifs etc.). In one non-limiting example, the illustrated graphical UI element 254-6 representative of a soccer referee with his hands raised may include, but is not limited to, animated raising of hands from bottom to top and then from top to bottom.

FIG. 3 illustrates an exemplary graphical elements message input UI view 300. As illustrated in FIG. 3, the graphical elements message input UI view 300, may include, but is not limited to, display screen 310, a scrollable message history UI element 316, a message input UI element 314, a received message UI element 320-1, selectable graphical elements recommendation UI element 318-1 and 318-2, on-screen virtual keyboard 340, selectable message input UI element 324, and/or selectable illustrated graphical elements preview UI element 322.

In some embodiments, the scrollable message history UI element 316 may include one more received social messages visually presented in one or more received message UI elements such as, for example, received message UI element 320-1 substantially justified or aligned to the left portion of the scrollable message history UI element 316. To enable the user to view the entire view the entire history of social messages, scrollable message history UI element 316 may also be scrolled (e.g., up and down) utilizing for example, a scroll finger gesture in the region defined by the scrollable message history UI element 316.

To enable a user to input a one or more social messages for transmission to the recipient user (e.g., recipient user "Jill Smith"), the message input UI element 314 in conjunction with on-screen virtual keyboard 340 may enable users to input one or more social messages for transmission to the recipient user.

To enable a user to view one or more recommended illustrated graphical UI elements, the graphical elements message input UI view 300 may further include one or more selectable graphical elements recommendation UI elements 318-1 and/or 318-2. As discussed above and/or elsewhere, the selectable graphical elements recommendation UI elements 318-1 and/or 318-2 may emphasize terms "hungry"

and/or "starving" in a communication intent clusters representative of a user's intent for hungry by underlining the, "hungry" and/or "starving" terms as illustrated. It may be appreciated once a user selecting a selectable graphical elements recommendation UI elements 318-1 and/or 318-2 utilizing a selection finger gesture, the graphical elements management component 190-1 may configure the graphical element rendering component 190-2 to render and visually present graphical elements preview UI view 400 including one or more illustrated graphical UI elements identified in a received list of recommended graphical elements information for the user's intent for hungry.

Additionally or alternatively, in some embodiments, the graphical elements management component 190-1 may configure the graphical element rendering component 190-2 to render and visually present graphical elements preview UI view 400 including one or more illustrated graphical UI elements the user have not purchased, purchased, owns, and/or recently used, when the user selects the selectable illustrated graphical elements preview UI element 322 utilizing a selection finger gesture. It may be appreciated that the user may return back to graphical elements message input UI view 300 for social message input by selecting the selectable message input UI element 324 utilizing a selection finger gesture.

Figure 4:
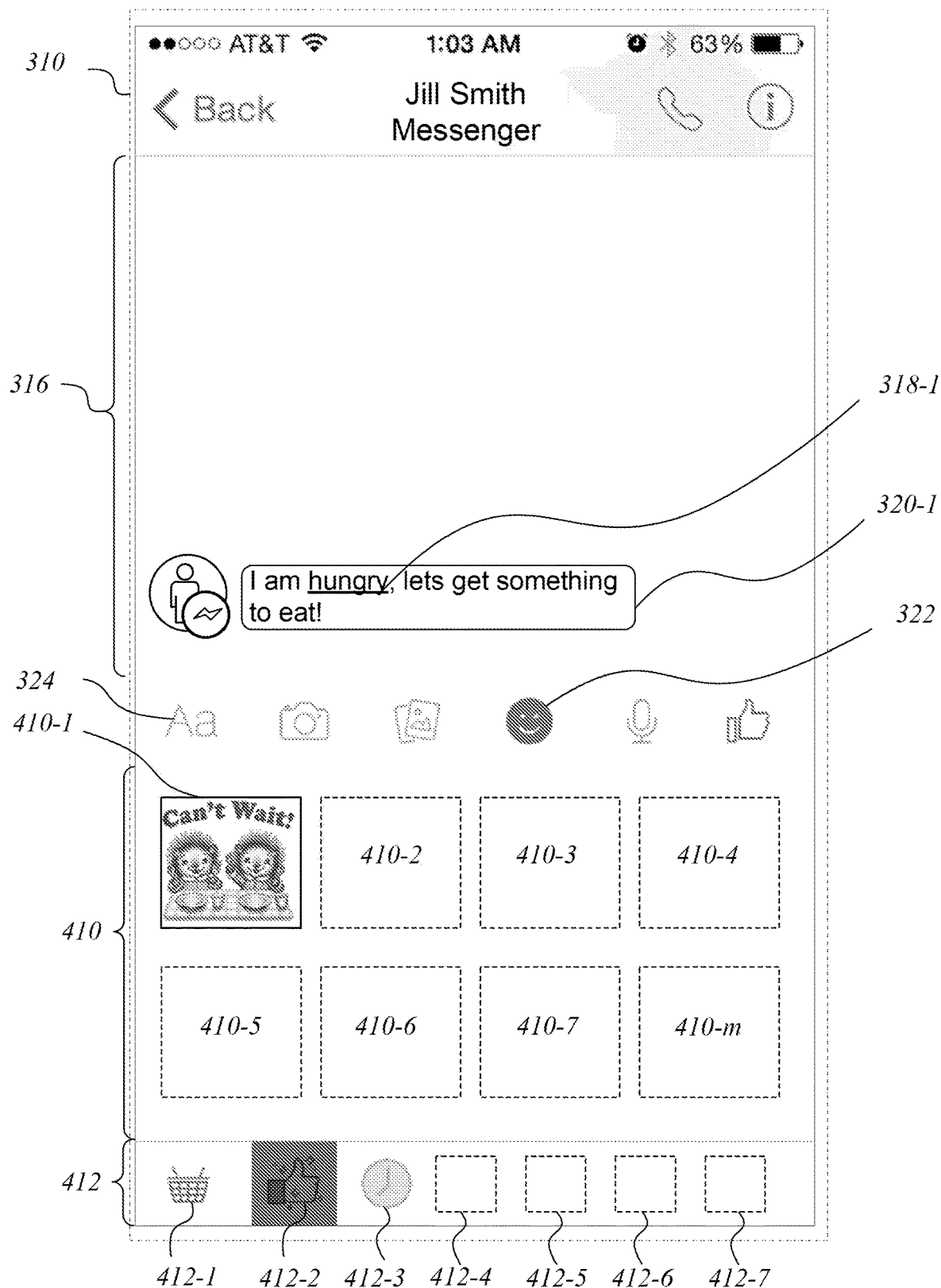
FIG. 4 illustrates a graphical element preview user interface view visually presenting one or more illustrated graphical user interface elements.

FIG. 4 illustrates a graphical elements preview UI view 400. As illustrated in FIG. 4, graphical elements preview UI view 400, which may include, among other UI elements, scrollable graphical element preview UI element 410, one or more selectable illustrated graphical UI elements 410-*m*, scrollable category selection UI element 412, and one or more selectable category UI elements 412-*n*.

In some embodiments the scrollable graphical element preview UI element 410 may visually present one or more selectable illustrated graphical UI elements 410-*m* in a 2 row by 4 column grid, when user selects the selectable graphical elements recommendation UI elements 318-1 and/or 318-2. Moreover, one or more selectable illustrated graphical UI elements 410-*m* may be representative of illustrated graphical UI elements identified in the list of recommended graphical element identifier information received from social networking graphical elements component 110-3. Additionally, in response to a selection utilizing a selection finger gesture for a selectable illustrated graphical UI element, such as selectable illustrated graphical UI element 410-1, the graphical elements management component 190-1 may transmit the social message in the message input UI element 314 and the graphical element identifier information associated with the selectable illustrated graphical UI element 410-1 to the recipient user as further illustrated in FIG. 5.

In instances when the list of recommended graphical element identifier information is sorted and ranked, the most popular illustrated graphical UI element may be visually presented at first row and first column (i.e., top left corner) of the scrollable graphical element preview UI element 410 with the lesser popular illustrated graphical UI elements at first row and second column. Accordingly, in a non-limiting example, the most popular illustrated graphical UI element may be illustrated graphical UI element 410-1, followed by the less illustrated popular graphical UI elements 410-2, 410-3, 410-4, and so forth.

In instances when the list of recommended graphical element identifier information includes one or more fixed sized groups, the first group may be visually presented starting with the first row and first column, first row second column, and so forth until all illustrated graphical UI elements are visually presented for the first group. This may be followed by the second group, third group, and so forth. Accordingly, in a non-limiting example, the first group of illustrated graphical UI elements may include illustrated graphical UI elements 410-1 and 410-2, the second group of illustrated graphical elements may include illustrated graphical elements 410-3 and 410-4, the third group of illustrated graphical UI elements may include illustrated graphical elements 410-5 and 410-6, and the remaining illustrated graphical UI elements may include, 410-7 until 410-*m*.

In some embodiments, the scrollable graphical element preview UI element 410 may visually present one or more purchasable illustrated graphical UI elements, when the purchasable category UI element 412-1 is selected utilizing a selection finger gesture by a user. In some embodiments, the scrollable graphical element preview UI element 410 may visually present one or more recommended illustrated graphical UI elements, when the purchasable category UI element 412-1 is selected utilizing a selection finger gesture. In some embodiments, the scrollable graphical element preview UI element 410 may visually present one or more recently used illustrated graphical UI elements when the selectable recently used category UI element 412-3 is selected utilizing a selection finger gesture by a user. In some embodiments, the scrollable graphical element preview UI element 410 may visually present one or more similar themed selectable illustrated graphical UI elements, when the themed category UI elements 412-4, 412-5, 412-6, and/or 412-7.

Figure 5:
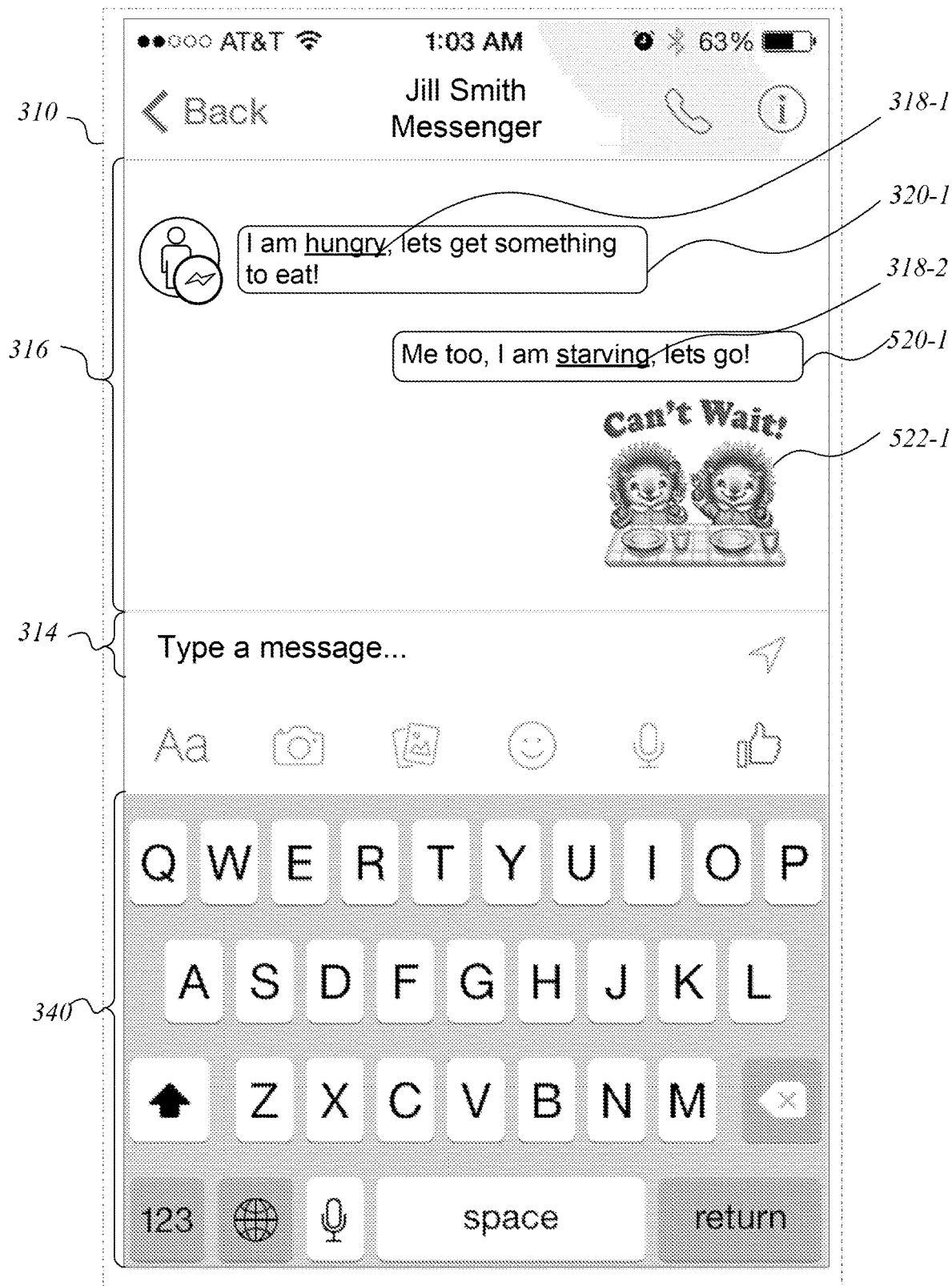
FIG. 5 illustrates another embodiment of the graphical elements message input user interface view after transmitting the social message and an illustrated graphical user interface element.

FIG. 5 illustrates another embodiment of the graphical elements message input user interface view 300 after transmitting the social message and an illustrated graphical user interface element. As illustrated in FIG. 5, the scrollable message history UI element 316 may also include one more transmitted social messages visually presented in one or more transmitted message UI elements such as, for example, transmitted message UI element 520-1 substantially justified or aligned to the right portion of the scrollable message history UI element 316. Additionally, the scrollable message history UI element 316 may also include the transmitted and/or received illustrated graphical UI element, such as, for example, transmitted illustrated graphical UI element 522-1 also justified or aligned to the right portion of the scrollable message history UI element 316. Although not illustrated, it may be appreciated that any transmitted illustrated graphical UI element may be justified or aligned to the left portion of the scrollable message history UI element 316 similar to the received message UI element 320-1.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram.

Figure 6:
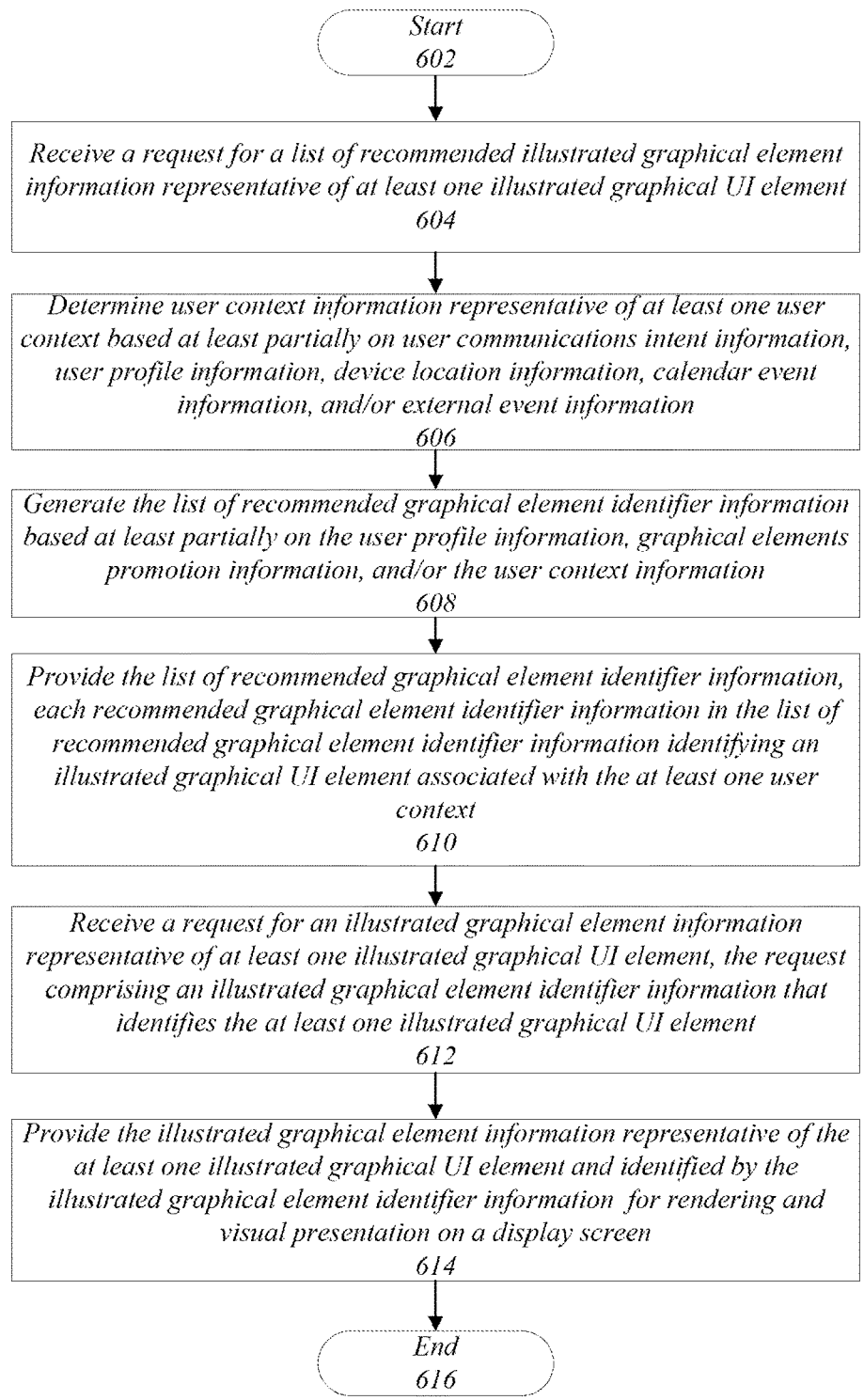
FIG. 6 illustrates an exemplary logic flow for at least determining list of recommended graphical element identifier information.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may start at block 602 and may receive a request from a mobile device for a list of recommended illustrated graphical element information representative of at least one illustrated graphical UI element. at 604. For example, social networking graphical elements management component 244 may receive a request from mobile device 102-1 to determine a list of recommended graphical element identifier information 230.

The logic flow 600 may determine user context information representative of at least one user context based at least partially on user communications intent information, user profile information, device location information, calendar event information, and/or external event information at 406. For example, context determination component 246 may determine the user context information 224 representative of at least one user context based at least partially on user communications intent information 208, user profile information 210, device location information 212, calendar event information 214, and/or external event information 216.

The logic flow 600 may generate the list of recommended graphical element identifier information based at least partially on the user profile information, graphical elements promotion information, and/or the user context information at 608. For example, graphical elements recommendation component 248 may generate the list of recommended graphical element identifier information 230 based at least partially on the user profile information 210, graphical elements promotion information 219, and the user context information 224.

The logic flow 600 may provide the list of recommended graphical element identifier information to the mobile device, each recommended graphical element identifier information in the list of recommended graphical element identifier information identifying an illustrated graphical UI element associated with the at least one user context at 610. For example, the social networking graphical elements management component 244 may provide the list of recommended graphical element identifier information 230 to the mobile device 102-1, each recommended graphical element identifier information in the list of recommended graphical element identifier information identifying an illustrated graphical UI element (e.g., illustrated graphical UI element 254-4) associated with the at least one user context.

The logic flow 600 may receive a request for an illustrated graphical element information representative of at least one illustrated graphical UI element, the request comprising an illustrated graphical element identifier information that identifies the at least one illustrated graphical UI element at 612. For example, social networking graphical elements management component 244 may receive a request from the mobile device 102-1 for illustrated graphical element information representative of at least one illustrated graphical UI element (e.g., illustrated graphical UI element 254-4), the request comprising illustrated graphical element identifier information representative of the at least one illustrated graphical UI element.

The logic flow 600 may provide the illustrated graphical element information representative of the at least one illustrated graphical UI element and identified by the illustrated graphical element identifier information for rendering and visual presentation on a display screen at 614 and end at 616. For example, social networking graphical elements management component 244 may provide the illustrated graphical element information representative of the at least one illustrated graphical UI element (e.g., illustrated graphical UI element 254-4) and identified by the illustrated graphical element identifier information to the mobile device 102-1 for rendering and visual presentation on a display screen 310 of the mobile device 102-1. The examples are not limited in this context.

Figure 7:
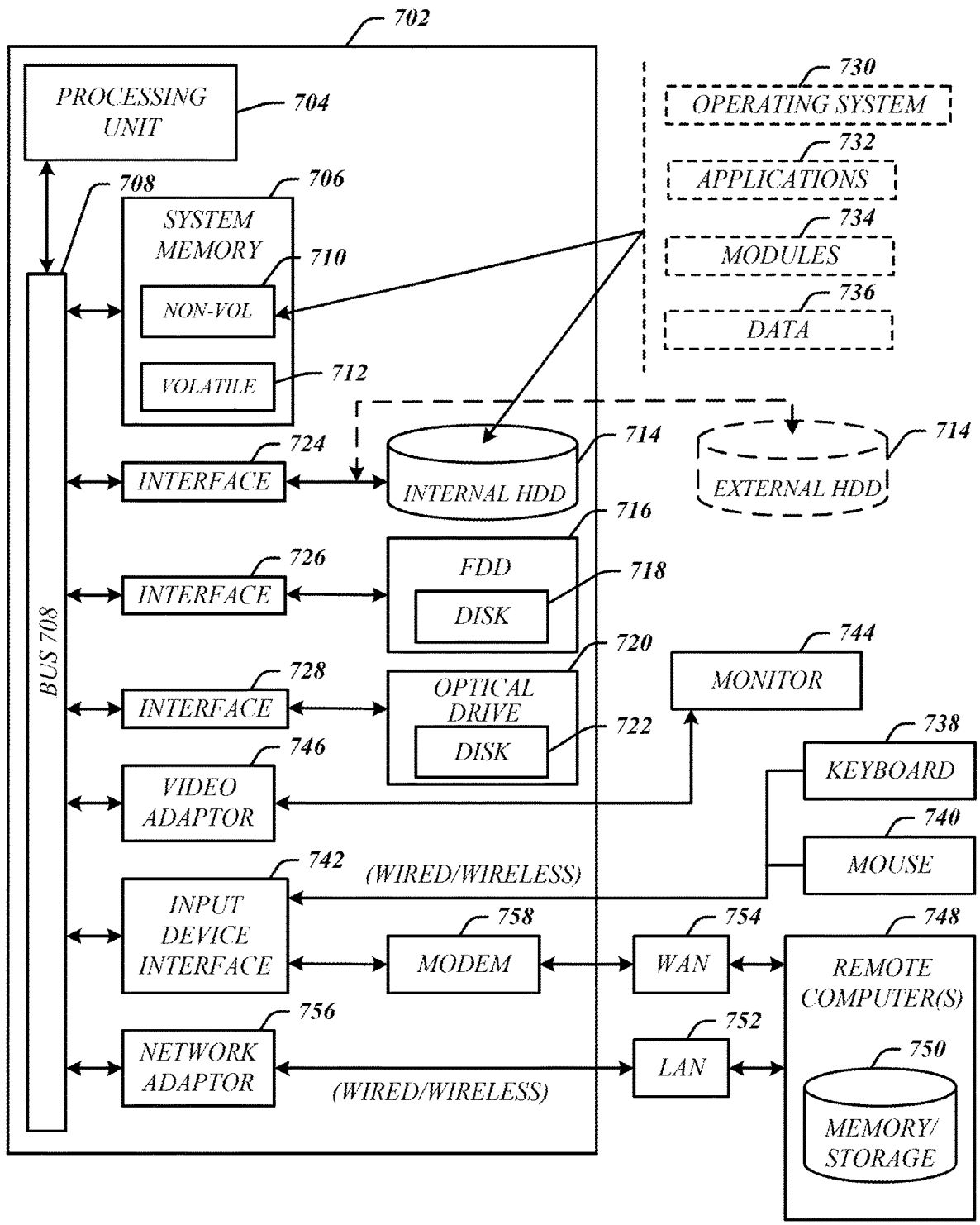
FIG. 7 illustrates an exemplary embodiment of a computing architecture.

FIG. 7 illustrates an embodiment of an exemplary computing architecture 700 suitable for implementing various embodiments as previously described, such as, for example server device 106 and/or one or more devices 102-a. In one embodiment, the computing architecture 700 may comprise or be implemented as part of an electronic device. In another embodiment, the computer architecture 700 may be implemented as part of a cloud computing platform as a physical machine or virtual machine in a network of one or more physical and/or virtual machines. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 704.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments need more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms 'first," "second," 'third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
analyzing one or more sent, received or pending social messages of a user to determine a user intent of the user;
identifying one or more terms, phrases or symbols within the social messages indicative of the determined user intent;
emphasizing, in the one or more sent, received or pending social messages, the one or more terms, phrases or symbols;
receiving a user selection of one or more of the emphasized terms, phrases or symbols;
selecting, based at least on the user-selected terms, phrases or symbols, a plurality of graphical elements for inclusion in a list of graphical elements, wherein all or a pre-determined portion of the selected graphical elements are promoted graphical elements for which a financial interest has been received from an owner of the promoted graphical elements; and
providing the list of selected graphical elements to the user.

2. The computer-implemented method of claim 1 wherein the selecting of the graphical elements is biased in favor of the promoted graphical elements based on the received financial interest.

3. The computer-implemented method of claim 1 further comprising:
providing a financial incentive to the user for sharing a promoted graphical element with one or more recipient users.

4. The computer-implemented method of claim 3 further comprising:
providing the financial incentive to the one or more recipient users with whom the user has shared the promoted graphical element.

5. The computer-implemented method of claim 4 wherein the financial incentive comprises a promotion or discount offered by the owner of the shared promoted graphical element.

6. The computer-implemented method of claim 1 further comprising:
sorting or ranking the selected graphical elements in the list of graphical elements based on a promotion status of the graphical elements and user ownership of the graphical elements.

7. The computer-implemented method of claim 1 further comprising:
reserving a predetermined number of spots at the top of the list of graphical elements for promoted graphical elements; and
placing one or more selected promoted graphical elements in the reserved spots.

8. The computer-implemented method of claim 1, the software further causing the apparatus to:
reserve a predetermined number of spots at the top of the list of graphical elements for promoted graphical elements; and
place one or more selected promoted graphical elements in the reserved spots.

9. The method of claim 1 wherein emphasizing the one or more terms, phrases or symbols comprises highlighting, underlining or otherwise providing an emphasis to the one or more terms, phrases or symbols.

10. An apparatus, comprising:
a processor circuit;
software, executing on the processor, to cause the apparatus to:
analyze one or more sent, received or pending social messages of a user to determine a user intent of the user;

identify one or more terms, phrases or symbols within the social messages indicative of the determined intent;

emphasize, in the one or more sent, received or pending social messages, the one or more terms, phrases or symbols;

receive a user selection of one or more of the emphasized terms, phrases or symbols;

select, based at least on the user-selected terms, phrases or symbols, a plurality of graphical elements for inclusion in a list of graphical elements, wherein all or a pre-determined portion of the selected graphical elements are promoted graphical elements for which a financial interest has been received from an owner of the promoted graphical elements; and provide the list of selected graphical elements to the user.

11. The apparatus of claim 10 wherein the graphical elements recommendation component is biased in the selection of the graphical elements in favor of the promoted graphical elements based on the received financial interest.

12. The apparatus of claim 11 wherein the one or more terms, phrases or symbols are emphasized by highlighting, underlining or otherwise providing an emphasis to the one or more terms, phrases or symbols.

13. The apparatus of claim 10 wherein a financial incentive is provided to the user for sharing a promoted graphical element with one or more recipient users.

14. The apparatus of claim 13 wherein the financial incentive is provided to the one or more recipient users with whom the user has shared the promoted graphical element.

15. The apparatus of claim 14 wherein the financial incentive comprises a promotion or discount offered by the owner of the shared promoted graphical element.

16. The apparatus of claim 10, the software further causing the apparatus to:

sort or rank the selected graphical elements in the list of graphical elements based on a promotion status of the graphical elements and user ownership of the graphical elements.

17. A non-transitory computer-readable storage medium comprising instructions that, when executed, cause a system to:

analyze one or more sent, received or pending social messages of a user to determine a user intent of the user;

identify one or more terms, phrases or symbols within the social messages indicative of the determined user intent;

emphasize, in the one or more sent, received or pending social messages, the one or more terms, phrases or symbols;

receive a user selection of one or more of the emphasized terms, phrases or symbols;

select, based at least on the user-selected terms, phrases or symbols, a plurality of graphical elements for inclusion in a list of graphical elements, wherein all or a pre-determined portion of the selected graphical elements are promoted graphical elements for which a financial interest has been received from an owner of the promoted graphical elements; and provide the list of selected graphical elements to the user.

18. The medium of claim 17 wherein the selecting of the graphical elements is biased in favor of the promoted graphical elements based on the received financial interest.

19. The medium of claim 17, the instructions further causing the system to:

provide a financial incentive to the user for sharing a promoted graphical element with one or more recipient users.

20. The medium of claim 19, the instructions further causing the system to:

provide the financial incentive to the one or more recipient users with whom the user has shared the promoted graphical element.

21. The medium of claim 20 wherein the financial incentive comprises a promotion or discount offered by the owner of the shared promoted graphical element.

22. The medium of claim 17, the instructions further causing the system to:

sort or rank the selected graphical elements in the list of graphical elements based on a promotion status of the graphical elements and user ownership of the graphical elements;

reserve a predetermined number of spots at the top of the list of graphical elements for promoted graphical elements; and place one or more selected promoted graphical elements in the reserved spots.

23. The medium of claim 17 wherein the one or more terms, phrases or symbols are emphasized by highlighting, underlining or otherwise providing an emphasis to the one or more terms, phrases or symbols.

\* \* \* \* \*